(12) United States Patent
Wojcicki et al.

(10) Patent No.: US 8,423,580 B2
(45) Date of Patent: Apr. 16, 2013

(54) SYSTEM AND METHOD FOR SPECIFYING AND IMPLEMENTING IT SYSTEMS

(76) Inventors: Tomasz Wojcicki, Brwinow (PL);
Michal Dolezek, Brwinow (PL)

(*) Notice: Subject to any disclaimer, the term of this patent is extended or adjusted under 35 U.S.C. 154(b) by 93 days.

(21) Appl. No.: 12/921,163

(22) PCT Filed: Sep. 17, 2008

(86) PCT No.: PCT/EP2008/062344
§ 371 (c)(1),
(2), (4) Date: Sep. 6, 2010

(87) PCT Pub. No.: WO2009/127264
PCT Pub. Date: Oct. 22, 2009

(65) Prior Publication Data
US 2011/0022588 A1    Jan. 27, 2011

(30) Foreign Application Priority Data
Apr. 16, 2008    (PL) .................................... PL385231

(51) Int. Cl.
*G06F 7/00* (2006.01)
*G06F 17/30* (2006.01)

(52) U.S. Cl.
USPC ........... 707/798; 707/805; 715/739; 715/752; 715/783

(58) Field of Classification Search .................. 707/695, 707/798, 805; 715/739, 752, 783
See application file for complete search history.

(56) References Cited

U.S. PATENT DOCUMENTS

| | | | | |
|---|---|---|---|---|
| 5,862,325 A | * | 1/1999 | Reed et al. | 709/201 |
| 6,088,717 A | * | 7/2000 | Reed et al. | 709/201 |
| 6,345,288 B1 | * | 2/2002 | Reed et al. | 709/201 |
| 6,757,710 B2 | * | 6/2004 | Reed | 709/203 |
| 7,263,663 B2 | * | 8/2007 | Ballard et al. | 715/762 |
| 7,480,712 B2 | * | 1/2009 | Moy | 709/223 |
| 2002/0095454 A1 | * | 7/2002 | Reed et al. | 709/201 |
| 2005/0004978 A1 | * | 1/2005 | Reed et al. | 709/203 |
| 2006/0242002 A1 | * | 10/2006 | Sun et al. | 705/11 |
| 2007/0027852 A1 | * | 2/2007 | Howard et al. | 707/3 |
| 2007/0239418 A1 | * | 10/2007 | Harrison et al. | 703/13 |
| 2007/0266329 A1 | * | 11/2007 | Gaudette | 715/763 |
| 2008/0086551 A1 | * | 4/2008 | Moy | 709/223 |

* cited by examiner

*Primary Examiner* — Phong Nguyen
(74) *Attorney, Agent, or Firm* — McNeely, Hare & War LLP; Kevin J. McNeely

(57) ABSTRACT

Present invention relates to system and method for specifying and implementing IT systems, in particular for searching functionalities. Proposed is a method of specifying and system for implementing interactive systems used for data storing and analysis as well as supporting collaboration and human-computer interaction, which is based on a control flow network structure. The method and system include support for whole lifecycle of implemented systems along with their evolution in time. In particular system comprising directed control net comprising data containers and functionality codes search module for searching functionalities within directed control net by identifying input, and matching identified input with functionality code according to the directed control net structure for generating a group of identified functionalities.

43 Claims, 30 Drawing Sheets

Continuation from FIG. 6B'
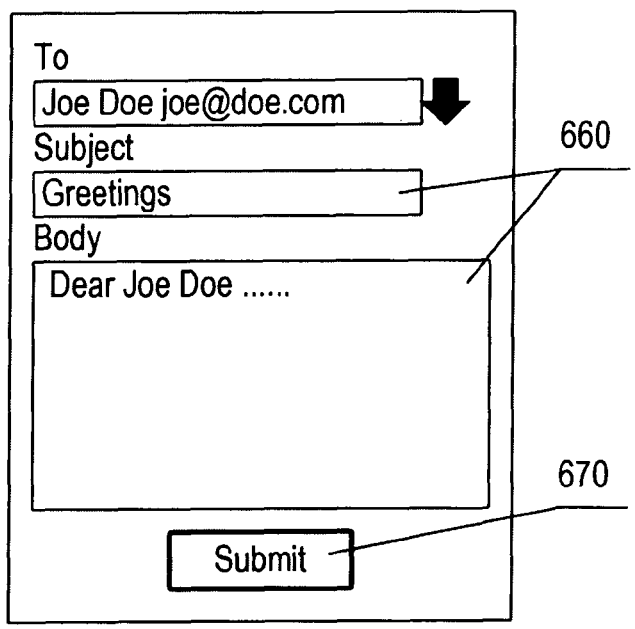
FIG. 6B"

Continuation from FIG. 11B'
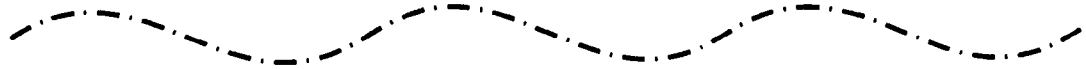
FIG. 11B"

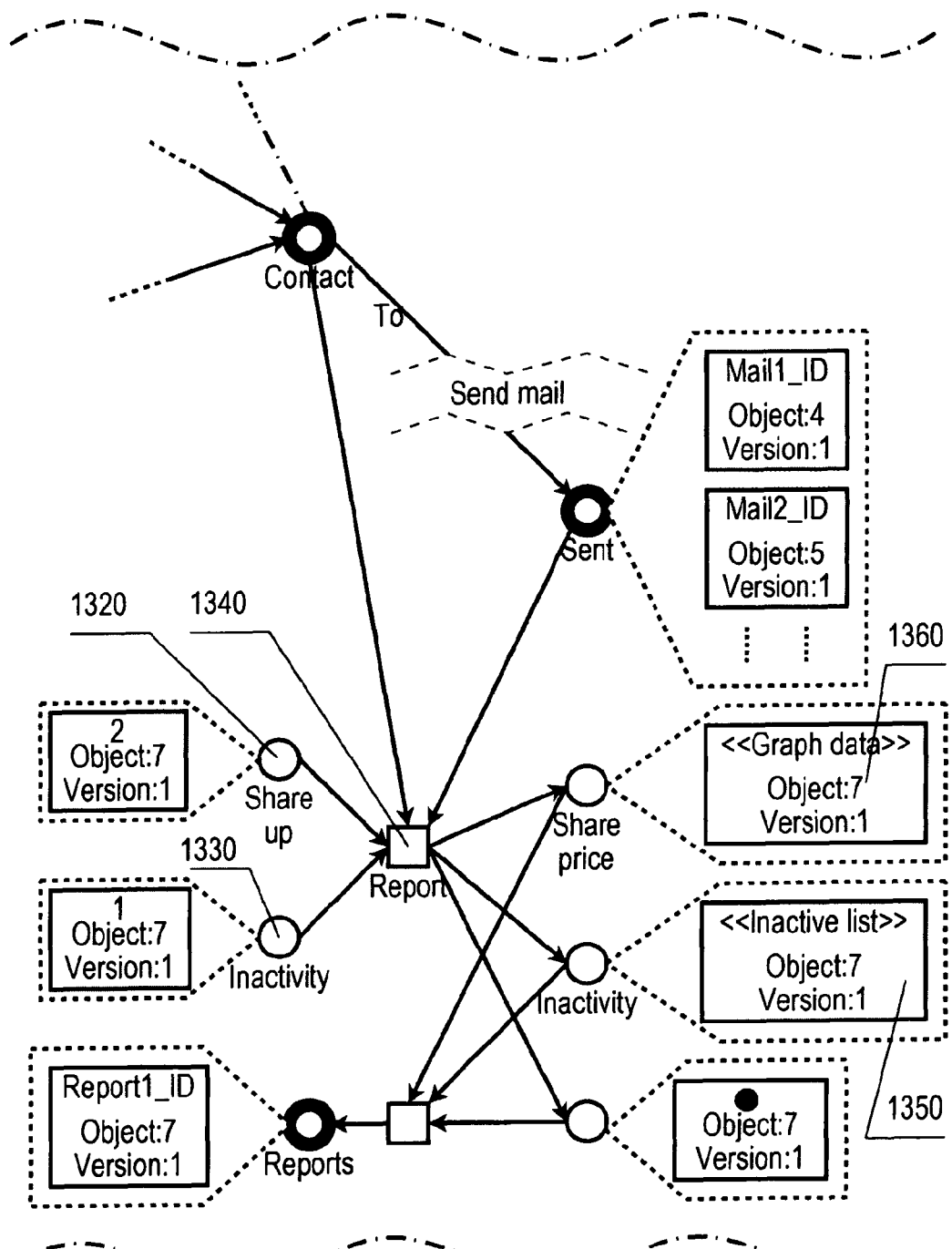
FIG. 13"

Continuation from FIG. 13"

Shares up in (weeks)
2

Inactivity for (months)
1

Next...

1370

1310

Share price chart in last 2 weeks

— Joe Lee

Clients not contacted for 1 month

1. Ann Kent ann@joe.com

Submit

FIG. 13'''

SYSTEM AND METHOD FOR SPECIFYING AND IMPLEMENTING IT SYSTEMS

CROSS-REFERENCE TO RELATED APPLICATIONS

This national phase entry application filed under 35 USC §371 claims priority to international application serial number PCT/EP2008/062344 filed on Sept. 17, 2008 and Poland application serial number PL385231 filed on Apr. 16, 2008, which are both incorporated by reference herein.

FIELD OF THE INVENTION

Present invention relates to system and method for specifying and implementing IT systems, in particular for searching functionalities. Proposed is a method of specifying and system for implementing interactive systems used for data storing and analysis as well as supporting collaboration and human-computer interaction, which is based on a control flow network structure. The method and system include support for whole lifecycle of implemented systems along with their evolution in time.

BACKGROUND OF THE INVENTION

US20060206348 A1 (D1) discloses an automated way for a non-technical person to create or modify software functionality in support of a business process without needing expertise in software. According to D1, an automated matching tool may apply user input expressed semantically to a database of semantic information associated with syntactic information, to match the user input with a service (e.g., an application program) capable of performing a business process step corresponding to the input. The matching tool is configured to perform matching between user information with services based on as association between semantic data and syntactic data.

The semantic persistent store 301 of D1 may comprise three kinds of semantic metadata: functionality metadata, service metadata, and instance descriptor metadata. Any of the three kinds of semantic data may be searched independently of the other two for matches with user input. In this connection, it should be understood that the functionality metadata, service metadata, and instance descriptor metadata do not necessarily overlap at all points. That is, each may contain information not present in the others A subset of the semantic persistent store 301 of D1 may include functionality metadata. The functionality metadata may provide a semantic context for a service look-up, at various levels of specificity which may be hierarchically arranged.

Another subset of the semantic persistent store 301 may include service metadata. Where the functionality metadata may function as a relatively coarse, contextual mapping to the syntactic metadata, the service metadata may act as a more granular mapping to the syntactic metadata.

Services are often interdependent and need to communicate with each other, i.e., call each other and pass each other parameters and data. The service metadata may comprise technical specifics relating to such interdependence and communication. For example, in an object-oriented implementation of a service, the service metadata may define operations available in an interface of the service that can be called by another service.

One of common problems present within the state of the art is a difficulty to implement changes in a working system. Current methodologies allow to build modular and scalable systems, but are less effective when an unexpected, nonstandard change needs to be made.

Another problem with popular software is badly customizable user interaction. Even systems that are well designed and easy to use, do not learn to interact with users. Rather the users have to learn to use the system.

Most data centered systems can only store logs of changes made to selected parts of the database. No analysis can be done when changes have not been logged.

A common problem in relational database design is finding balance between data redundancy and performance. Usually minimizing redundancy results in a slower and more complicated system. Another problem present in the state of the art is model checking of complex system, in particular it is difficult to manage changes within such systems.

SUMMARY OF THE INVENTION

The above identified problems are solved by this invention.

Accordingly, the present invention has been made keeping in mind the above problems occurring in the prior art, and an object of the present invention is to provide system and method for specifying and implementing IT systems In order to accomplish the above object, the present invention provides a method for searching functionalities within a directed control net comprising data containers and functionalities identifying input within the directed control net, and matching identified input with functionality according to the directed control net structure for generating a group of identified functionalities The present invention also provides a system comprising directed control net comprising data containers and functionalities search module for searching functionalities within directed control net by identifying input within directed control net, and matching identified input with functionality according to the directed control net structure for generating a group of identified functionalities Further the present invention also provides a data base system wherein data are stored within the directed control net along with the functionality codes, and functionality codes transform data when transitions are performed according to structure of the directed control net.

The present invention relates also to a computer program being adapted when run on a computer.

This invention can be applied in most of software systems, mainly in office and web applications which support collaboration and data management. Systems built using this invention are based on a network structure, which enables changes to be implemented on any fragments of the system without affecting the rest of it. User interaction is based on user searching for system's functionalities, which makes the system adapt optimally to each user's query and is similar to natural dialog interaction between people. Data storing method is capable of storing historical information about every piece of data stored in the system without a need for system builder to indicate which changes need to be logged for future analysis. Also the problem of data redundancy is minimized as network structure allows any needed connections between data to be made, minimizing redundancy. Since the system model is a networked model all analytical tools and methods used for the designing and verifying networks can be applied.

DETAILED DESCRIPTION

Figure 15:
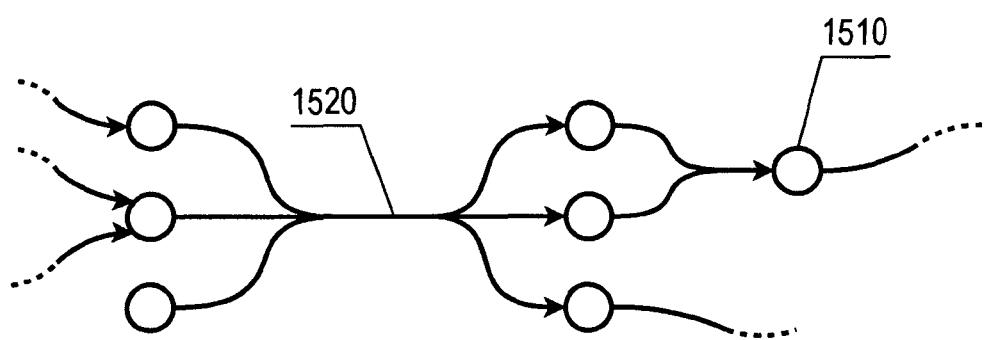
FIG. 15 illustrates a directed control net's structure
Figure 16:
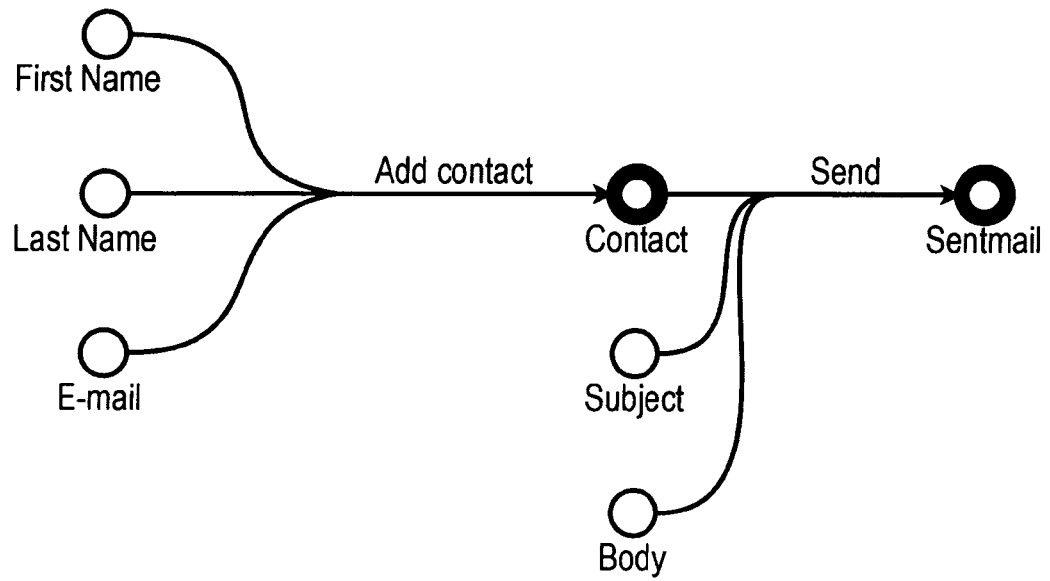
FIG. 16 illustrate the same directed control net using abstract notation
Figure 17:
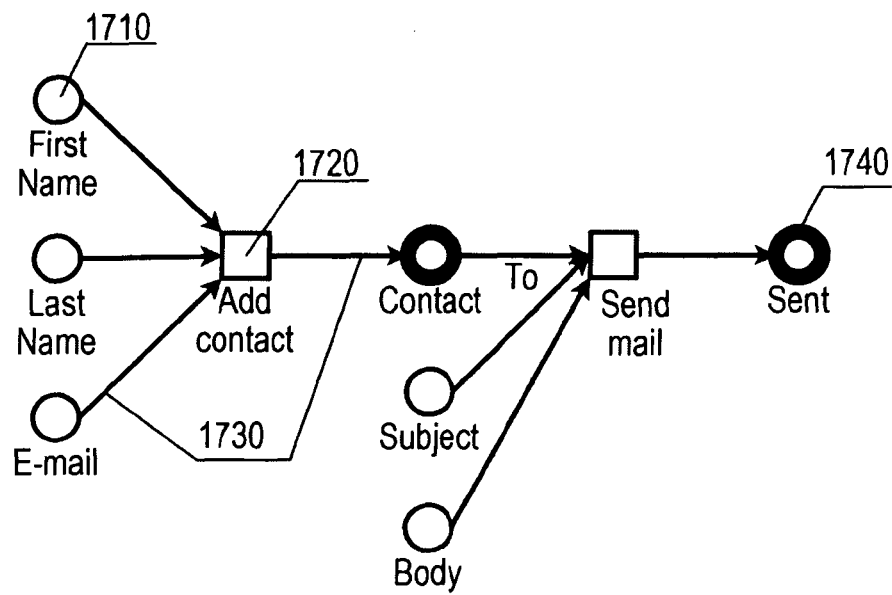
FIG. 17 illustrate the same directed control net as Petri-net.

Detailed description of the inventions it is made using the following definitions explained with reference to FIGS. 15 to 17.

Directed Control Net (DCN) is a network of nodes (1510) connected with directed arcs (1520) which can connect any number of nodes with any number of nodes. Each node can store data. Each arc can store functionality code, which can be executed when control follows that arc. DCN can be implemented as a Petri Net. Entity relationship diagram or any other graph meeting given criteria. It should be noted, generally, that for convenience, Petri Net is used as an exemplary implementation of DCN. This invention is by no means bound by this example.

In case of a Petri Net implementation, nodes of a DCN are represented by Petri Net places (1710) and arcs are represented by transitions (1720). Each transition representing an arc is connected to places which represent nodes connected by the arc (1730).

When data appears in all mandatory input places of a transition, that transition becomes active. An active transition can be fired. When a transition fires, the functionality code stored within that transition can be executed. Functionality code is a computer program that transforms data expressed in any programming language e.g. PL/SQL, Java, Pascal, C, prolog, Lisp, etc. Functionality code stored within a transition has access to data stored in input places of that transition. Data resulting from execution of functionality code is stored in transition's output places. Filling the output places with computed data, can activate subsequent transitions and effectively transfer control further, according to the direction of arcs connected to the transition.

System input is a list of places matched to data tokens which can be stored in that places.

External input is any data introduced to the system from external sources e.g. search query, UI form data, RSS data, etc.

Identifying system input is a process of finding a list of places matched to data tokens identified basing on external input. We will use a search query as an exemplary external input.

Data tokens are identified in a query by any means of transformations or interpretations, e.g. assuming that tokens are separated by space, comma, finding all declinations of a word etc. Identifying data tokens results in a list of tokens.

Matching these tokens with places of DCN can be done based on data already stored in those places by any similarity function including identity. Matching data tokens with places of DCN can also be done based on metadata describing data stored in places, e.g. regular expressions etc. or based on any other information.

When a data already stored in the system matches any part of query in any way, the token that represents object containing that data is found and that token matched with a place where it is stored (1740) is added to the resulting list.

Matching system input with functionalities is a process of finding a list of functionalities based on a list of places matched with data tokens. It is done by finding all transitions connected to the places on the input list. The resulting list of functionalities may contain a configuration of data tokens in places for each element of the list. The resulting list of functionalities may be ordered with any function defining order on the functionalities from the list, e.g. alphabetical order.

User can choose which functionalities from the list should be run.

Control engine is a mechanism responsible for executing the functionalities and controlling the state of DCN.

When executing a functionality, control engine assures that all data needed to run that functionality is known to the system, inserts proper data tokens into input places of a transition representing that functionality and runs the functionality code.

After execution of a functionality code, control engine inserts the results into output places of the transition representing that functionality and searches for functionalities available after the change of DCN state made by executing the functionality.

Executing a functionality creates a new context. A context denotes actual execution of a single functionality. After the functionality is successfully finished, data from a context form a new object.

As a functionality is executed, data tokens that have been entered, remain in places where they were originally entered, while DCN's control flow goes on. Those data tokens are tagged with current execution's context identifier. When DCN reaches the end of the functionality, all data tagged with this context identifier become component data of a new object. This object may also contain other objects.

Component objects may be created during the execution of a functionality by executing another functionality on top of the first one as a subfunctionality. Execution of that subfunctionality may result in a new object that can be used as a component object of the basic functionality. A subfunctionality may be used for instance for adding new contact while sending e-mail. Component objects may also be selected from objects already stored in the system, for instance for choosing recipients of the e-mail from a contact list.

When the functionality ends, an object identifying token is automatically created. Identifying token is a handle that lets other objects as well as users, indicate this object.

Reading object's data is possible by finding all data tokens tagged with the same object identifier as the identifying token. As each data token is in the place where it was originally entered, it is possible to determine the way the object was created by analyzing which places of the functionality creating that object were filled.

An object can be edited by executing the functionality that created it, with object's data already filled in context so that it could be changed during execution. A different way of going through the functionality can be chosen while editing, for instance to enter data that was not needed before. Editing of an object can also be done in a way that would be more comfortable for making single changes than going through the whole functionality.

Editing functionality can create a new version of edited object instead of changing stored data. This way version tracking can be implemented. Version tracking is saving whole history of changes made to an object similarly to a CVS system. As every data token is stored in a separate place, it is possible to store only changed tokens in new versions of the changed objects to save storage space. In this case, to read an object in a given version, the system needs to find each component data token in as new version as possible, but not newer than the given version. Determining the path with which the object was created in each version is easier, when at least a version identifying data token is created in each step of the functionality during editing. When reading a given version of the object, these version identifying data tokens will guide the reader through different paths of the functionality.

An object can be deleted by deleting all data tokens that are contained in it, including the identifying token.

Deleting objects with version tracking enabled is done by marking it's identifying token as deleted, so that it still could be read in older versions or restored.

Version tracking can be enriched with information when each version was valid. This enables a time machine functionality—user can see the state of the whole system or it's any part from any given point in the past.

Detailed description of the invention will be made with reference to FIGS. 1 to 14.

Figure 1A:
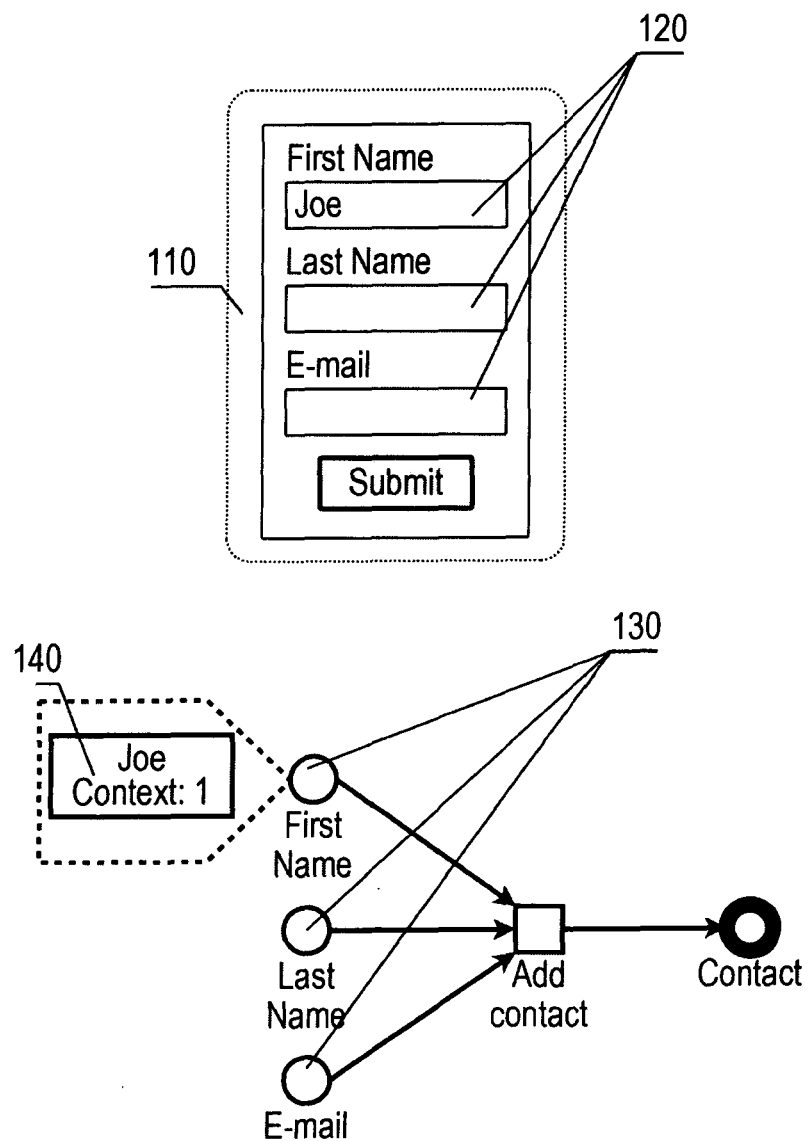
FIGS. 1A-B show a simple functionality being executed from the user's and system's point of view.

According to FIG. 1, we start with a simple example of "Add contact" functionality in a simple CRM system. At first, this functionality only lets the user enter and store basic data of a new contact—first name, last name and e-mail address.

The "Add contact" functionality is chosen from the user interface. Choosing this functionality creates a new context in which data will be stored and displays a form (110), which enables the user to fill the "First Name", "Last Name" and "E-mail" fields. Each field (120) of the form (110) represents a place in the underlying DCN (130). Data entered by the user is tagged with newly created context and put into the corresponding places (140).

Figure 1B:
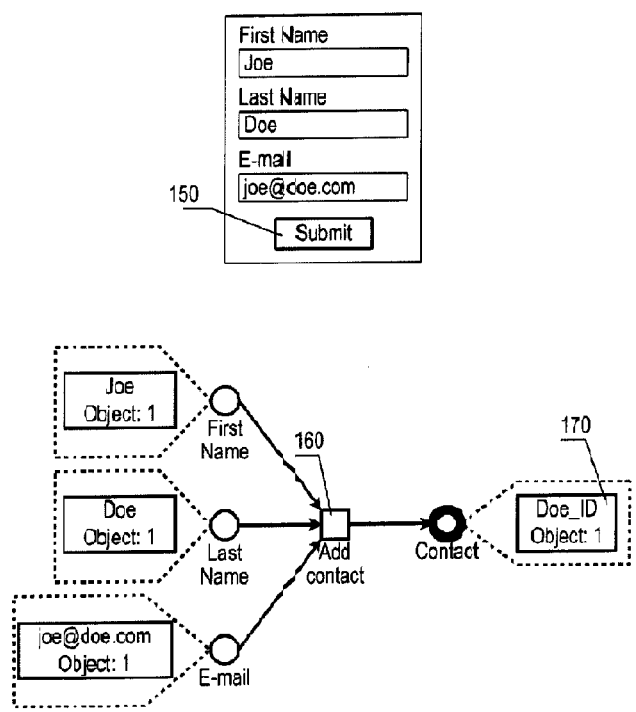

After filling the form, user clicks the "Submit" button (150) and the "Add contact" functionality code (160) is executed with the data from current context. In this simple example the code is empty. As this is the end of "Add contact" functionality and the data needs to be saved, current context becomes an object stored in the DCN as shown in FIG. 1B. As a handle to that object, an identifying token is generated onto the "Contact" place (170).

Figure 2A:
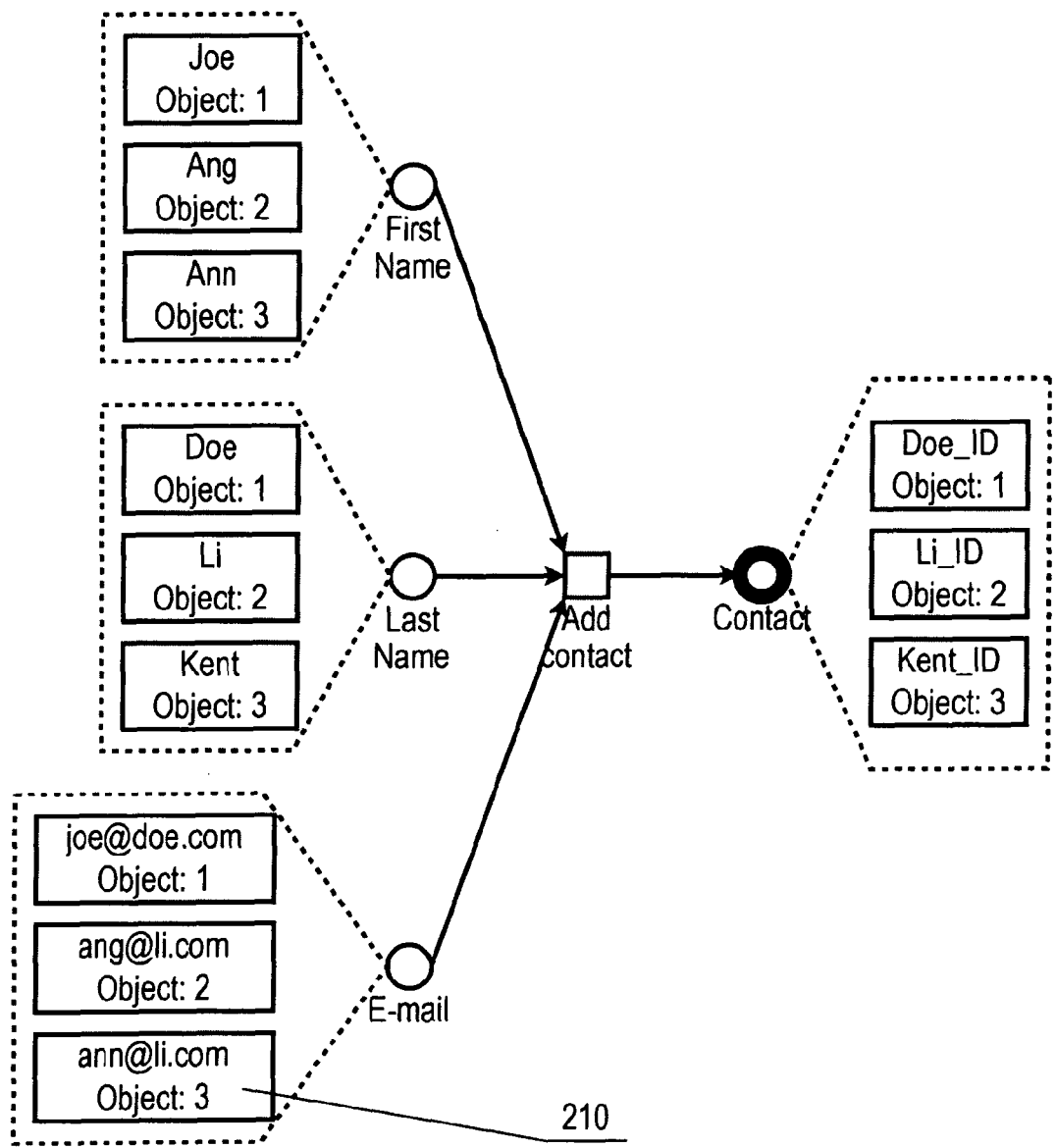
FIGS. 2A-B illustrate editing of a stored object from the user's and system's point of view.
Figure 2B:
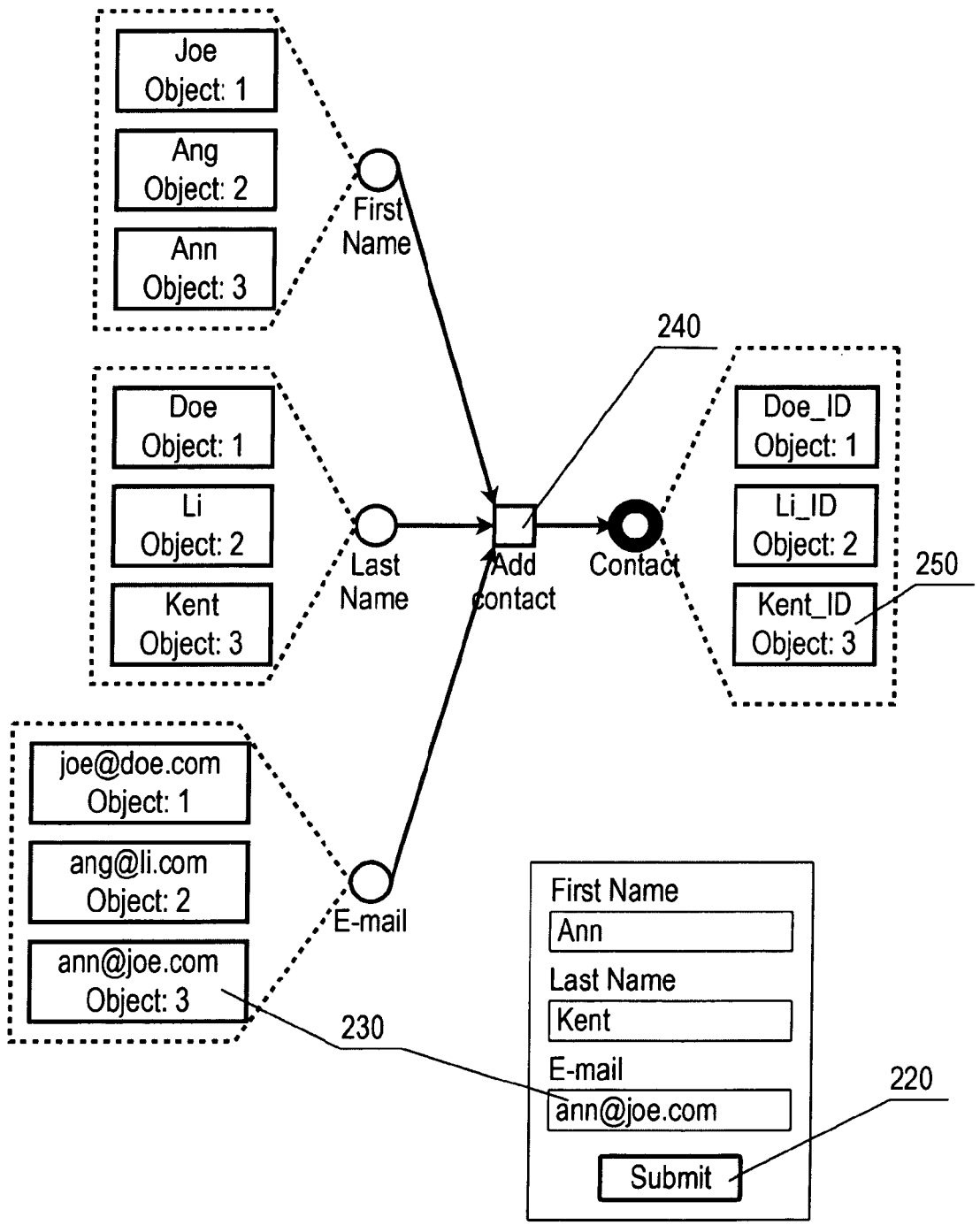

According to FIG. 2 adding data of Ang Li and Ann Kent has been done in the same way. But Ann's e-mail address (210) is wrong, so it needs to be changed.

As editing data of an object in the DCN is done almost in the same way as adding it, the system automatically has this capability. Editing is done based on the object's identifying token which determines the object being edited.

When editing a contact, user sees the same form as when adding, but the fields are already filled with contact's data. When user clicks the "Submit" button (220) all the changes made to object's data (230) are saved in DCN and functionality code (240) is executed with new data. The identifying token remains unchanged (250).

After editing Ann's e-mail address, user wants to delete Ann's data.

Figure 3:
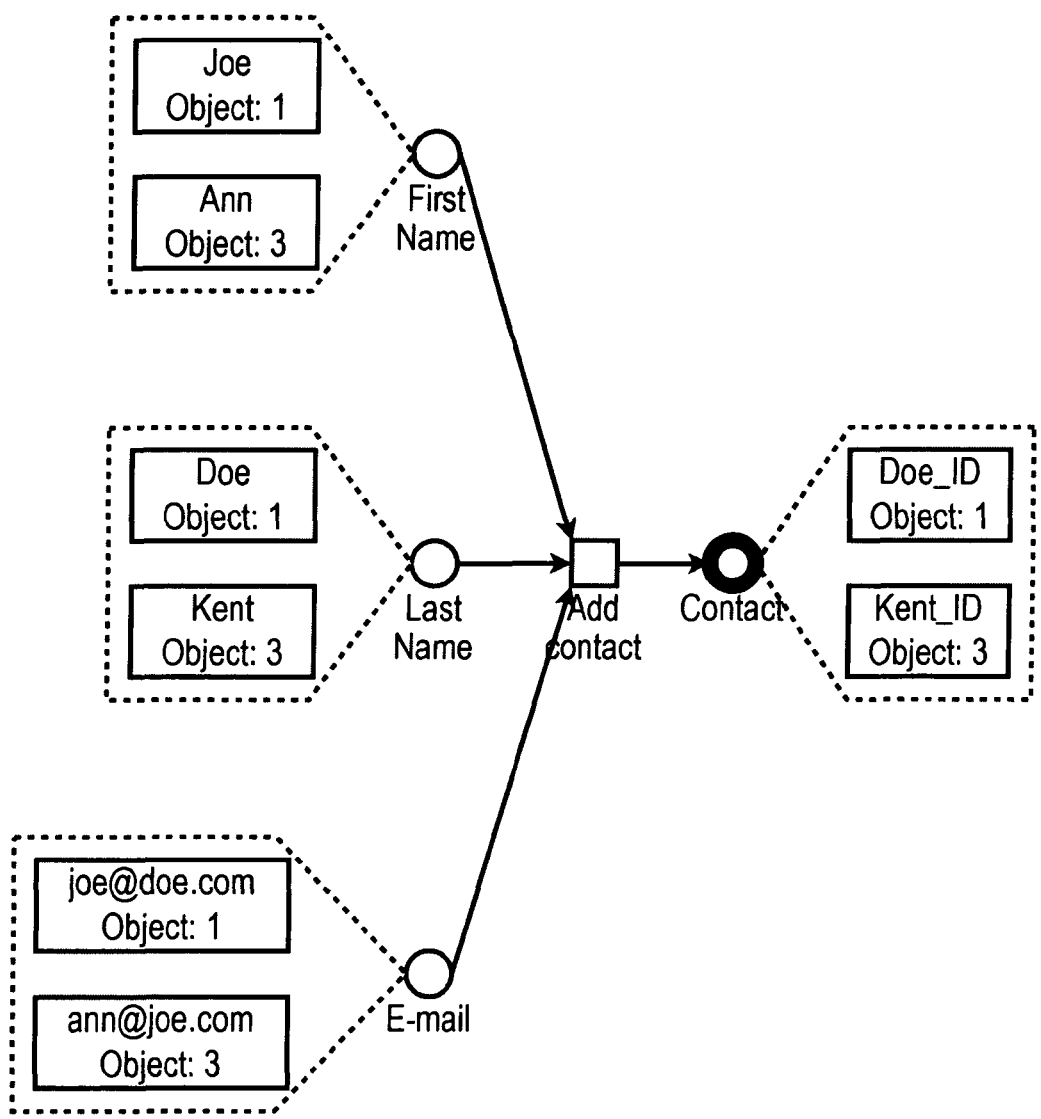
FIG. 3 shows system state after an object has been deleted.

According to FIG. 3, deleting an object based on its identifying token is another automatic capability of DCN. System finds all data tokens tagged with the same object identifier as the identifying token and deletes them.

Both "Edit" and "Delete" functionalities can be implemented as normal parts of DCN, but since they are basic functionalities of every IT system and their behavior is the same for every kind of object, this exemplary implementation of DCN adds them automatically.

As the whole system is evolving, a need of an e-mail sending functionality has emerged.

Figure 4:
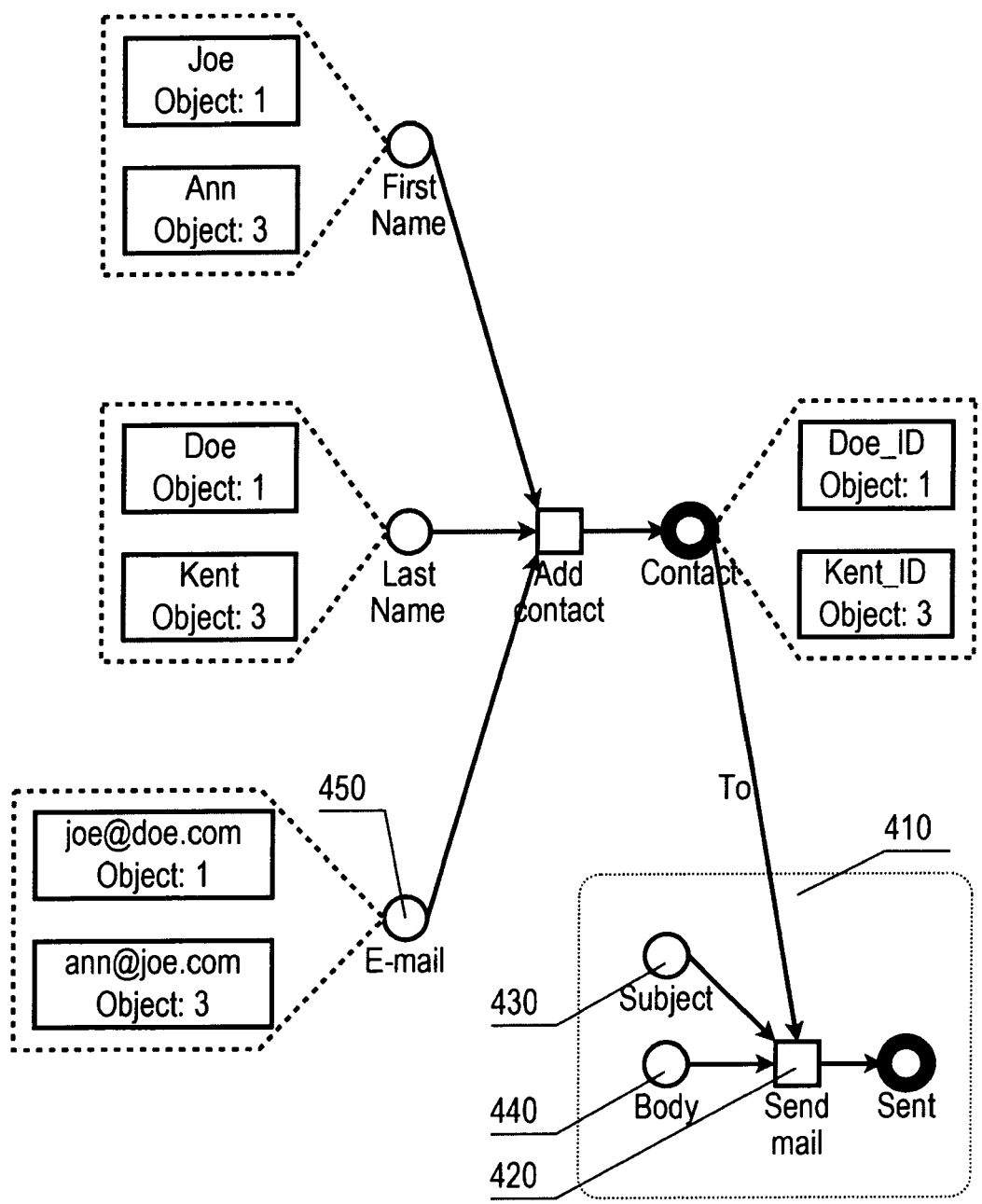
FIG. 4 illustrates adding a new functionality to the system.

According to FIG. 4, administrator adds this functionality to the system by expanding the DCN with a new transition "Send mail", two input places for subject and body of the message and an output place to identify the sent message (410). The functionality (420) code is responsible for the actual sending of the message.

After the e-mail sending has been added, user can find this functionality when using the search feature.

Figure 5A:
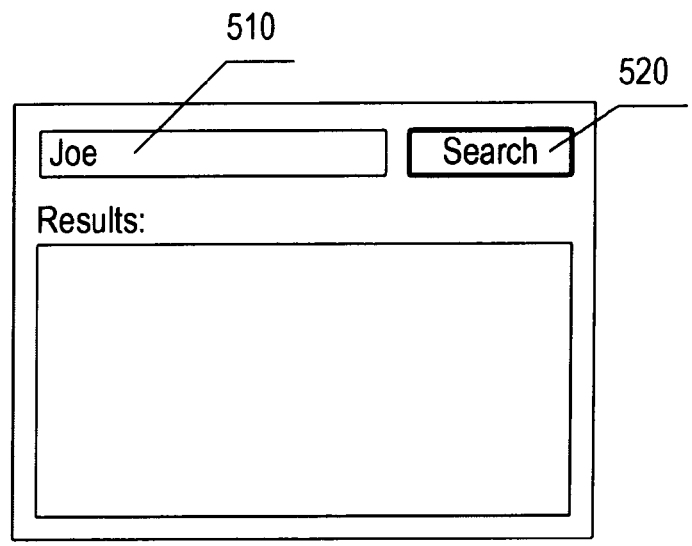
FIGS. 5A-B illustrate functionality search from the user's and system's point of view.
Figure 5A:
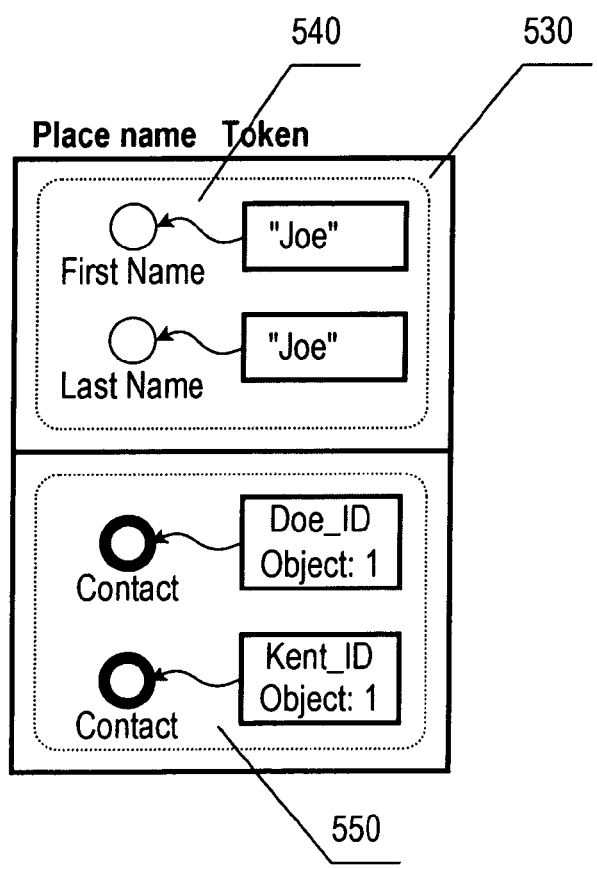

According to FIG. 5, when user types "Joe" in the search box of the search module (510) and clicks the "Search" button (520), the search process starts. First, a search context is created (530), where identified system input will be stored. Then the system identifies all data tokens in the user's query. In this case there is just one data token—"Joe". Then the process of identifying system input based on that token starts.

In this process system finds places in which token "Joe" could possibly be stored based on metadata and data tokens already stored.

Each place's metadata describes whether the place can be used in identifying system input or not (for instance "Subject" (430) and "Body" (440) places are excluded in this example), what kind of data can be stored in it (for instance a text with ' @' sign for "E-mail" (450)), etc.

In this example two places match the criteria—"First name" and "Last name". Each of them paired with data token "Joe" is put into search context (540). The match with "First name" place is positioned higher, since an identical token is already stored in it.

During identifying system input, system also looks for already stored objects that contain the searched tokens. In this case both objects contain the searched token. This results in adding new matches to the search context (550). Both of them are identifying tokens matched with the "Contact" place. Since object 1 contains the searched token in "First name" and in "E-mail" places, while object 3 only in "E-mail", object 1 is positioned higher as a better match.

Next step in the search process is matching system input with functionalities, which will give the final search result.

In this step system finds all transitions connected to places in the search context and creates a list of functionalities represented by these transitions. Functionalities are listed with examples how the user's query matches each functionality's input places.

These exemplary matches are based on the list of identified tokens in search query and the identified search context in a way that each identified token is used only once in context of each listed functionality. Thanks to this rule, there is no result containing functionality "Add contact" with both First and Last name filled with token "Joe", which would be improper since user entered "Joe" only once in the query.

When an identifying token is in the search context, the "Edit" and "Delete" functionalities matched with the identified object (560) are automatically added to the search result functionality list.

Figure 5B:
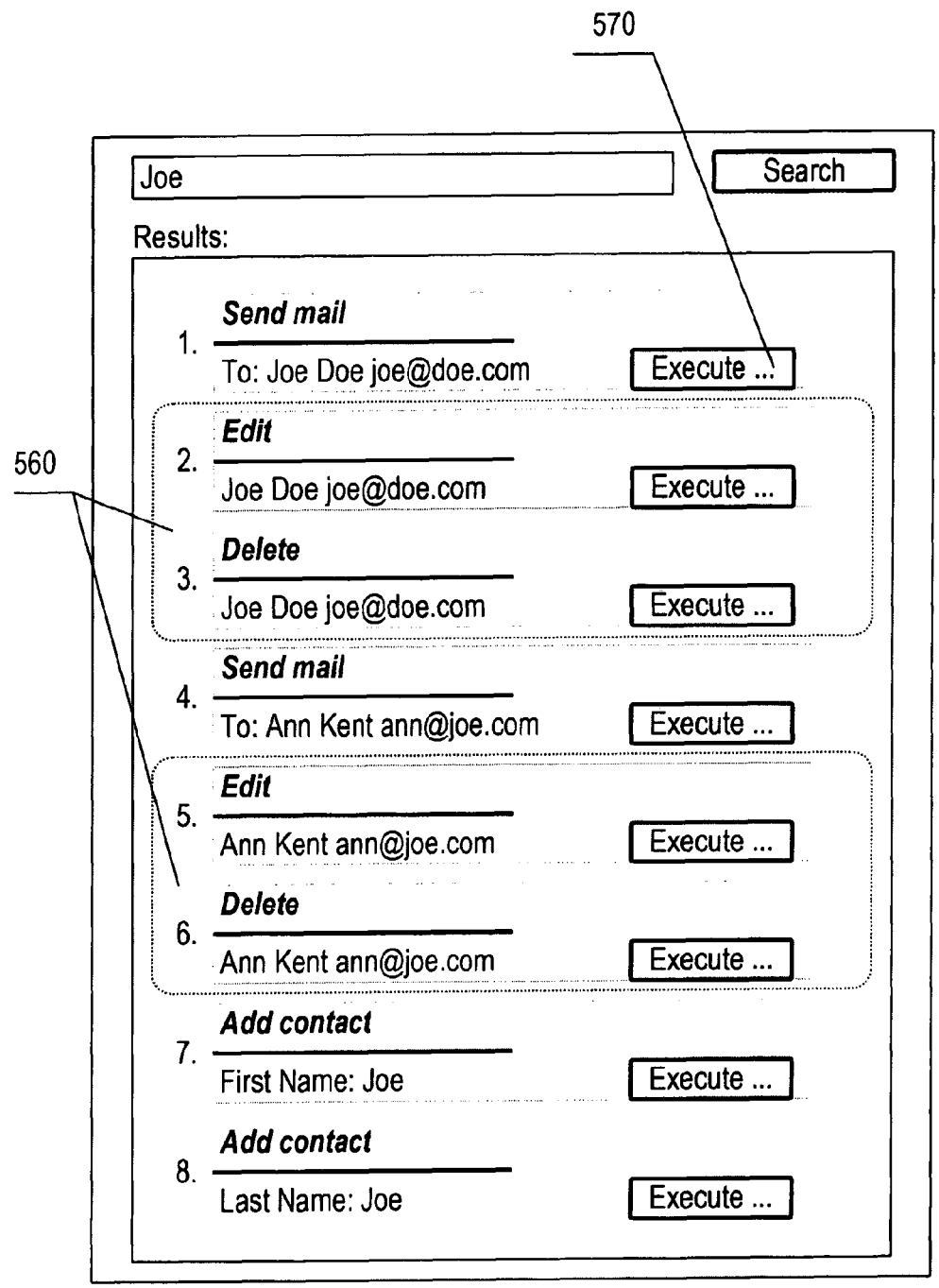

The result list for this example is shown in FIG. 5B. Order of the functionalities is subject to individual implementations. In this case, better matching pairs from search context are higher and a priority is given to functionalities using stored objects over those creating new objects.

Since user wanted to send mail to Joe Doe, it's enough to click on the "Execute" button next to the appropriate result (570).

Figure 6A:
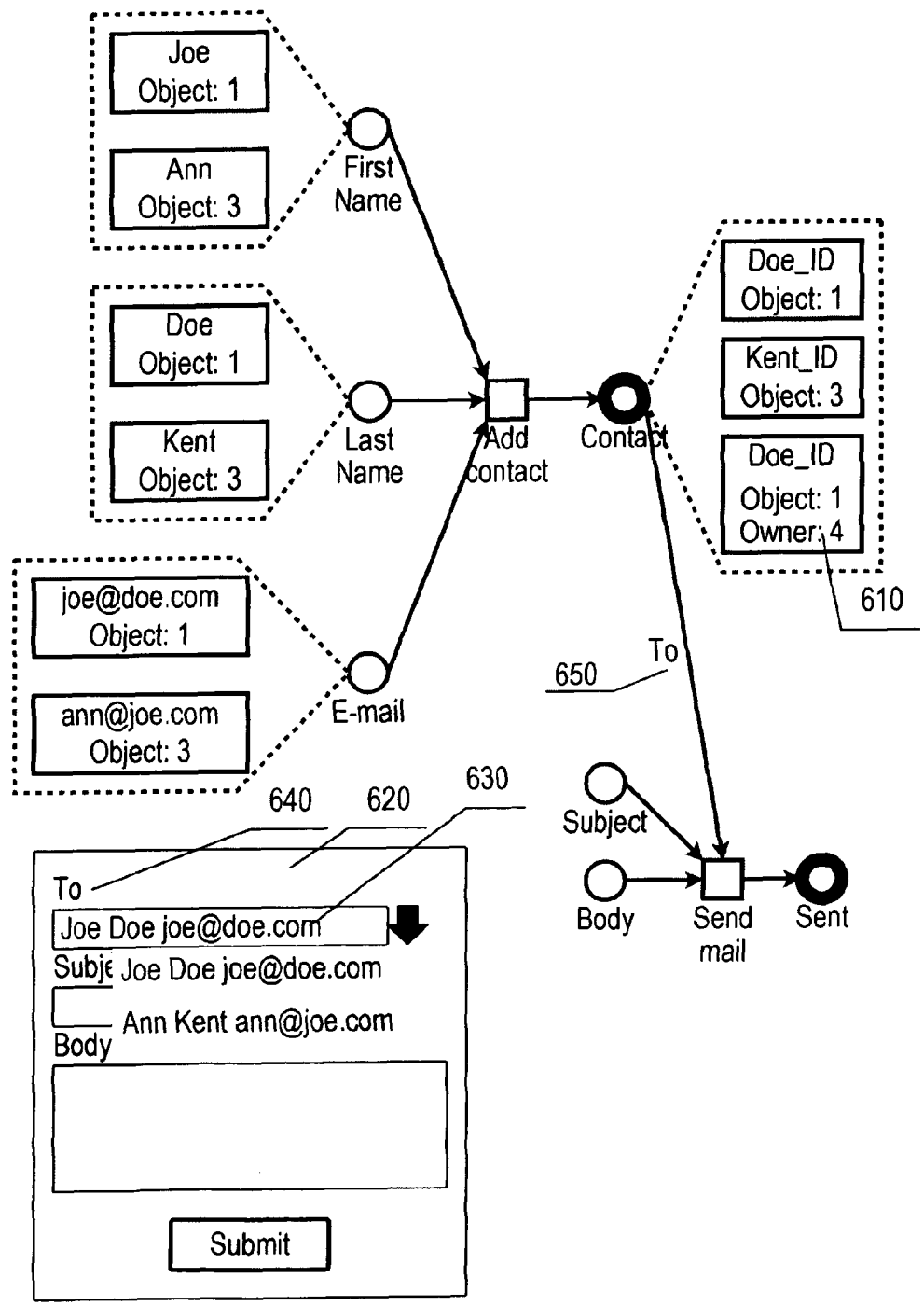
FIGS. 6A-B illustrate executing a functionality that uses stored objects from the user's and system's point of view.
Figure 6B:
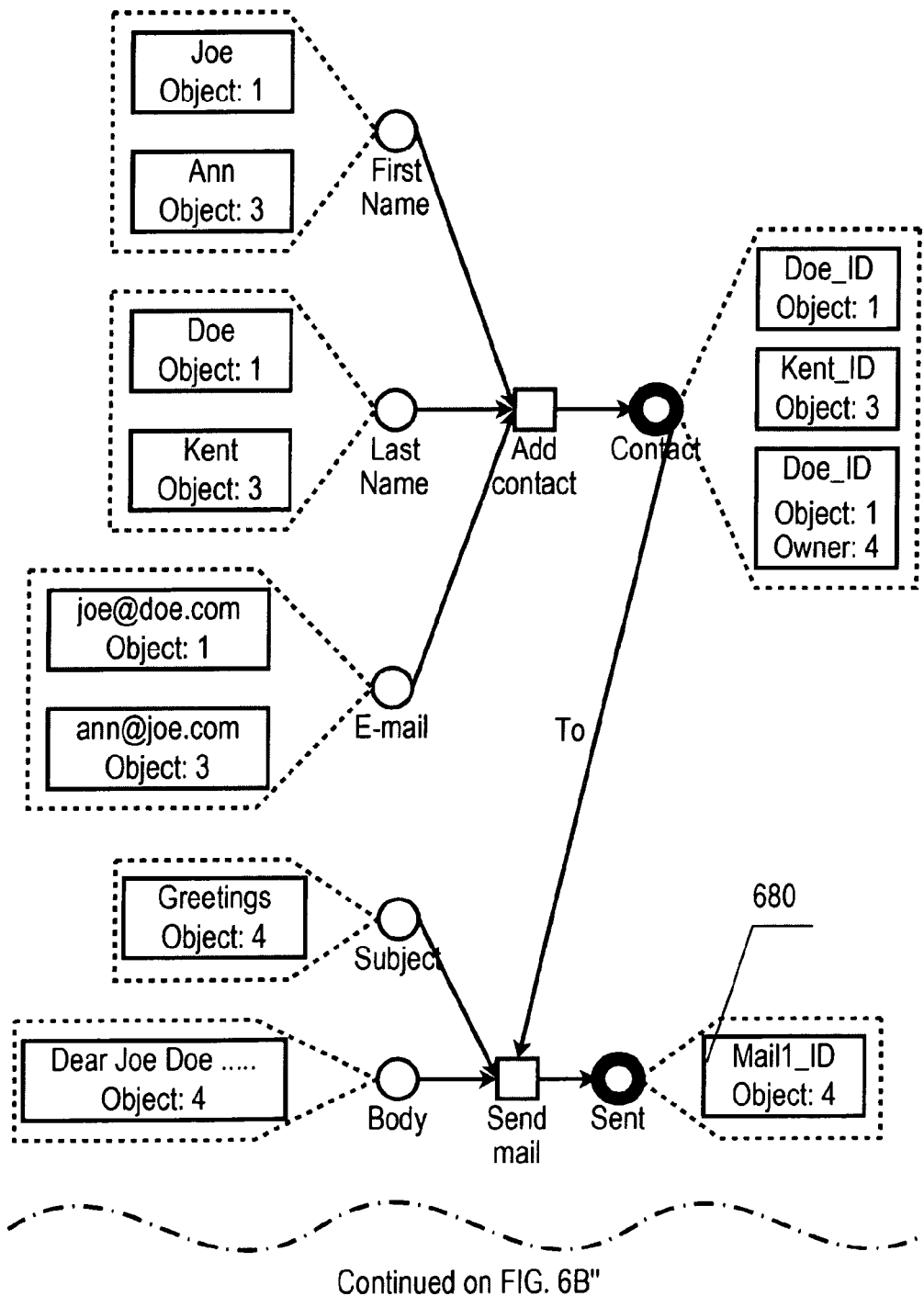

According to FIG. 6, this runs the "Send mail" functionality (410) in the same way as "Add contact" was run, but the newly created context already contains a copy of the found contact's identifying token (610). The copy still identifies object 1, but context 4 is indicated as its owner so in fact it belongs to the new context. This way, when a form (620) is displayed, the recipient of the e-mail is already chosen (630), although this selection can be revised and user can choose to send the message to someone else. Note that the original name of the "Contact" place has been overridden in the user interface (640) by a name of the arc leading from that place to "Send mail" functionality (650).

Now user can fill the "Subject" and "Body" fields (660) and click "Submit" (670) to send the message. The functionality (420) code forms a proper e-mail formatted message and sends it over the network. As this is the end of "Send mail" functionality, an identifying token is generated in place "Sent" (680) to give access to the sent message later.

With the usage of the system, users report that they need information about their customers' companies stock share price. Of course not all customers are stock companies, so the two types need to be distinguished.

Before implementing that change, administrator decides to enable the version tracking feature of DCN. Version tracking works in two ways. First, the system tracks changes made to the "Add contact" functionality and remembers all versions of that functionality. Second the system remembers all versions of stored objects.

Figure 7:
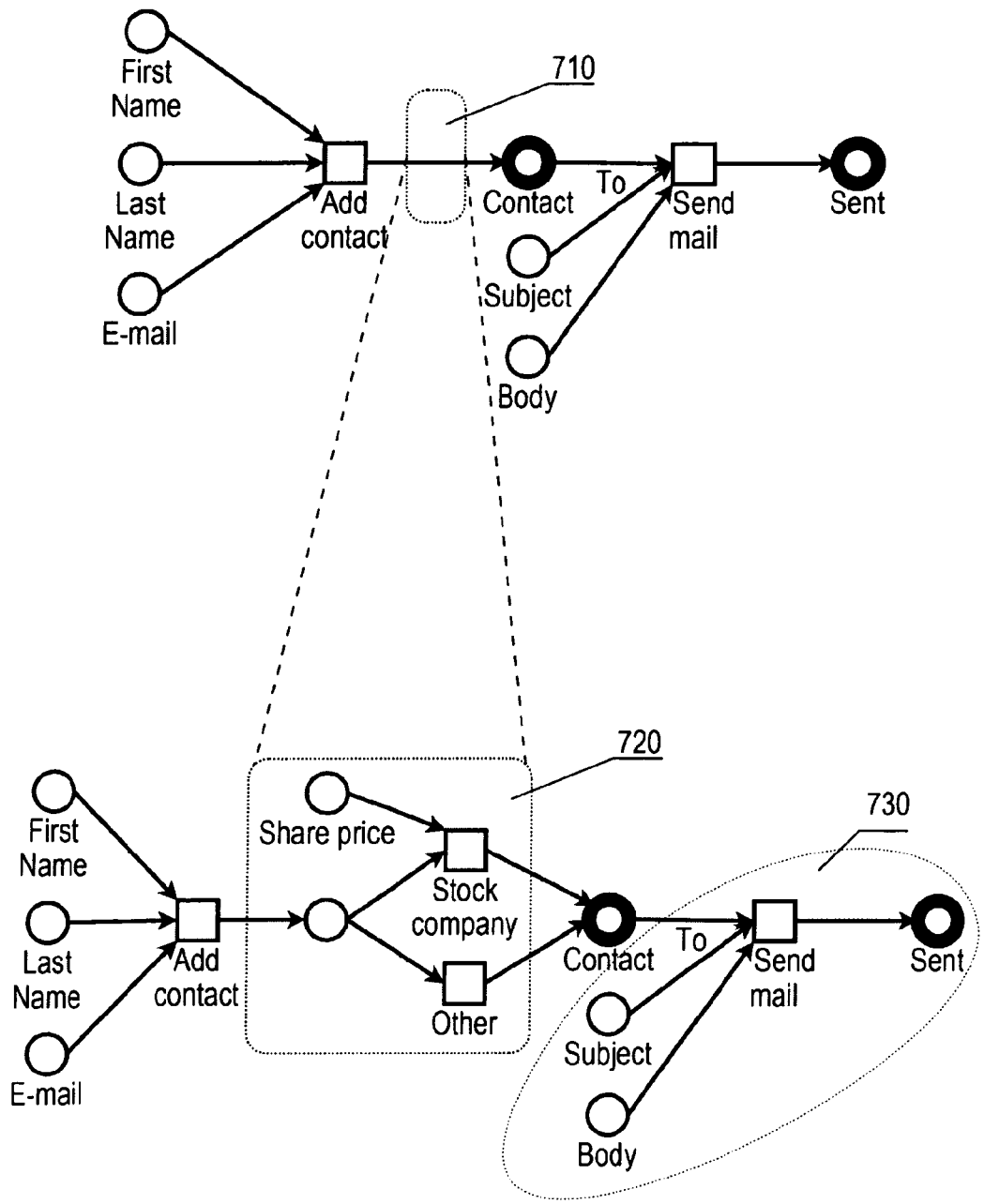
FIG. 7 illustrates changing of a functionality
Figure 8A:
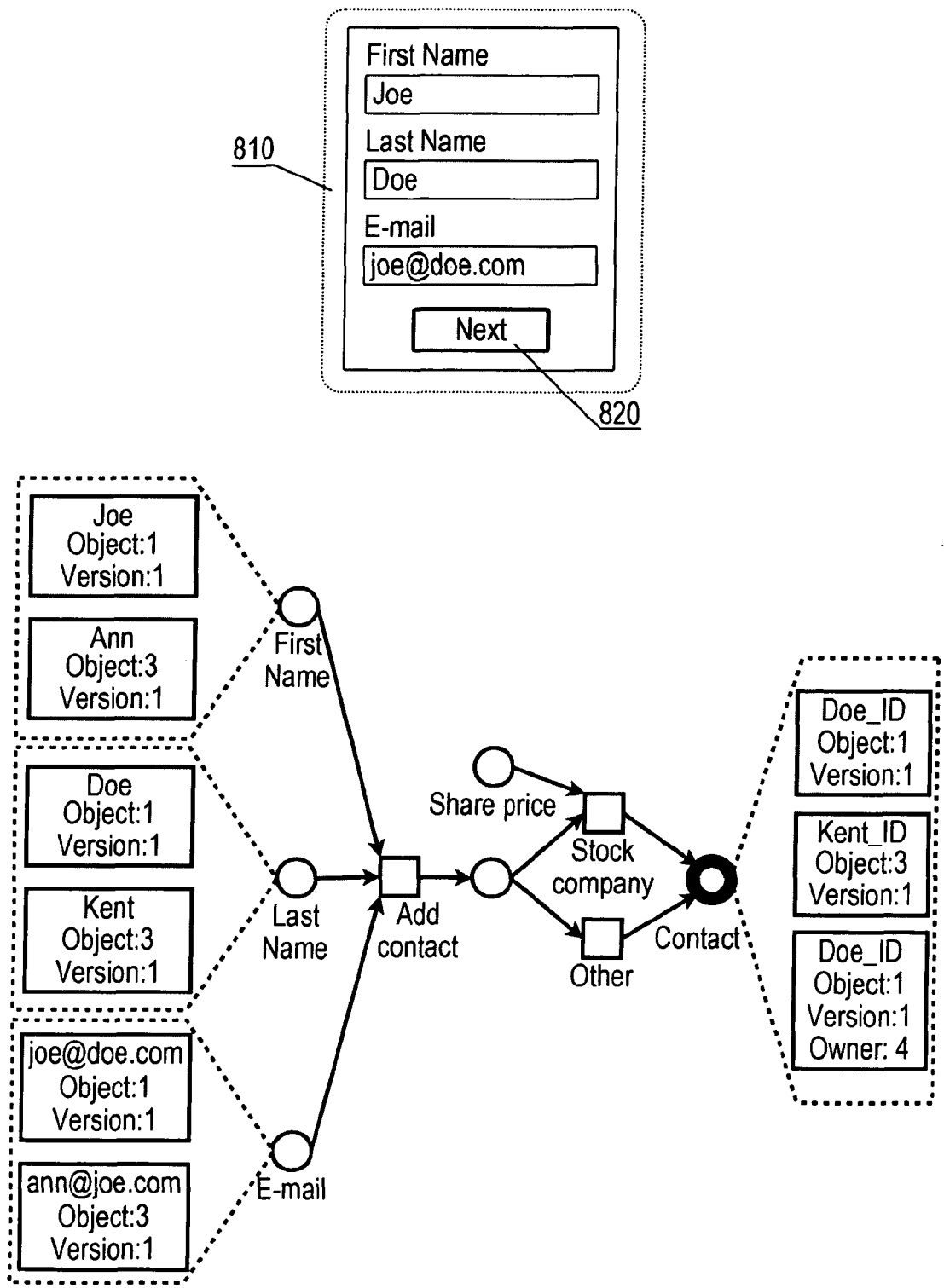
FIGS. 8A-C illustrate editing by creating a new version of an object after changing the functionality that created it from the user's and system's point of view.
Figure 8B:
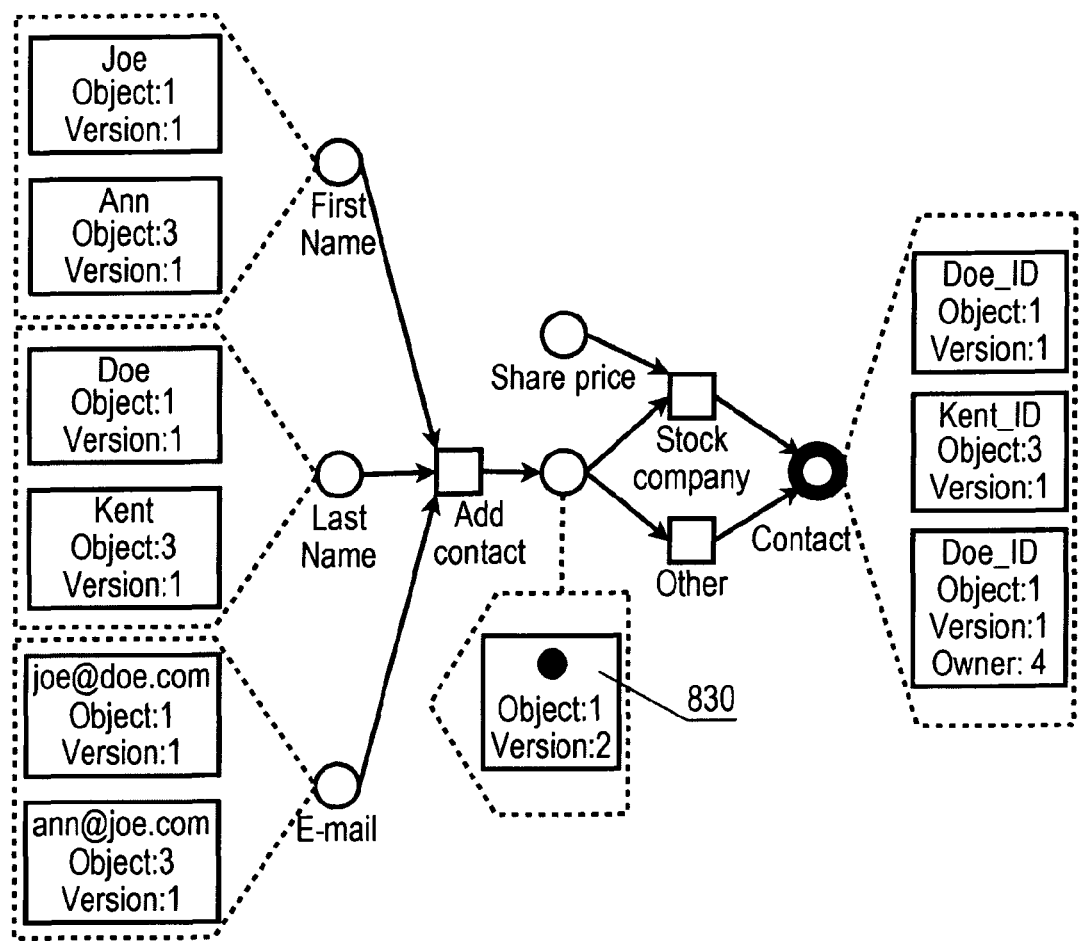
Figure 8B:
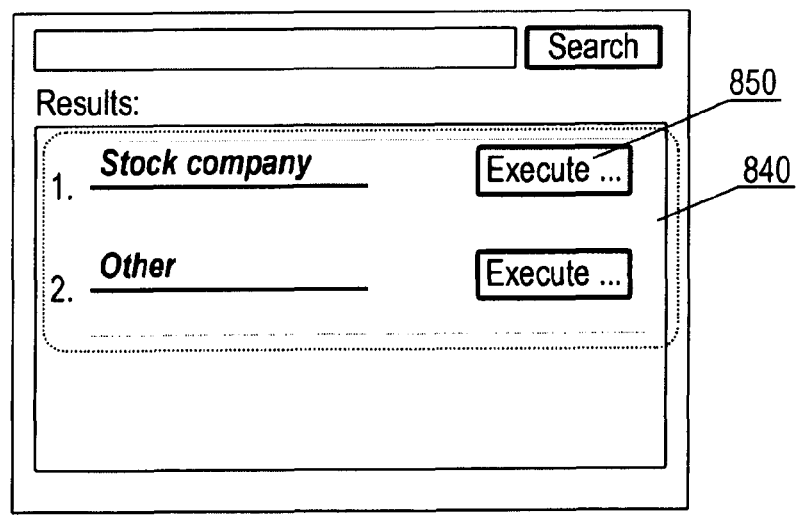
Figure 8C:
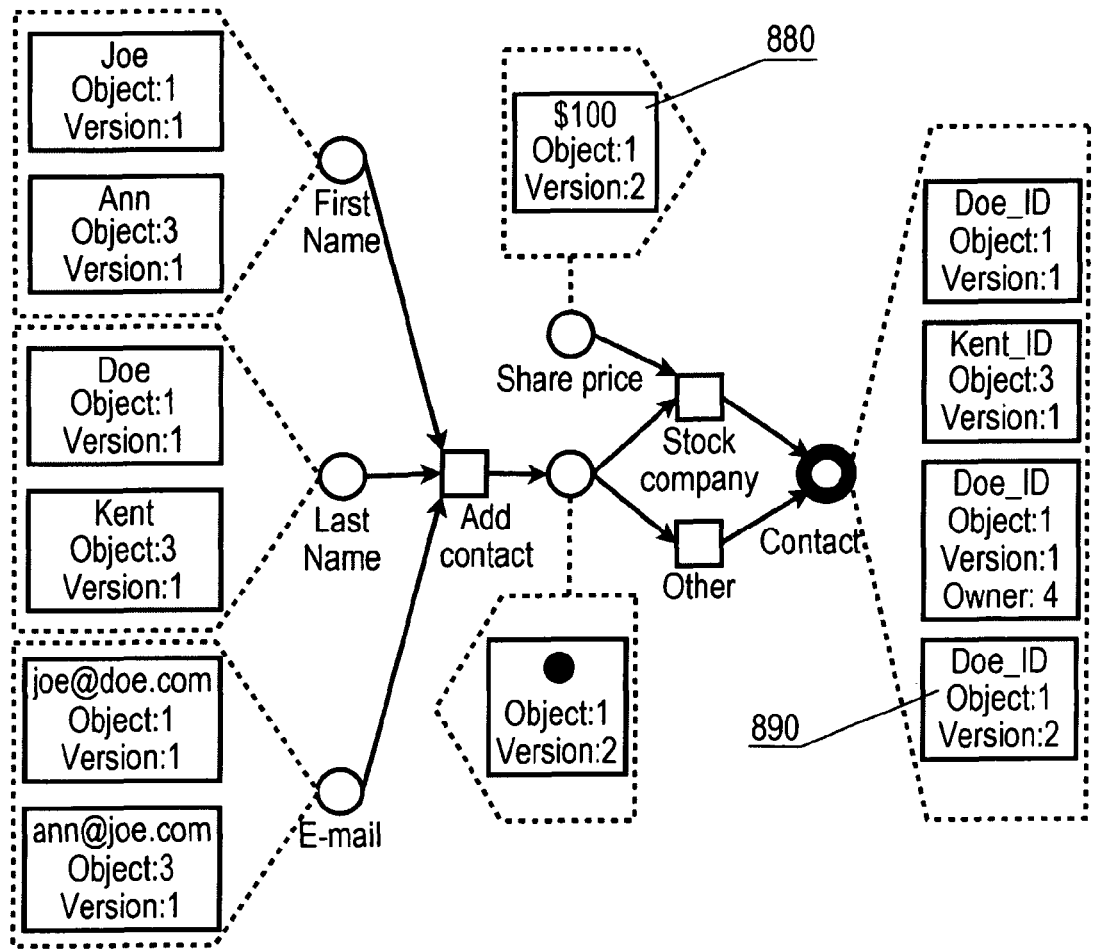
Figure 8C:
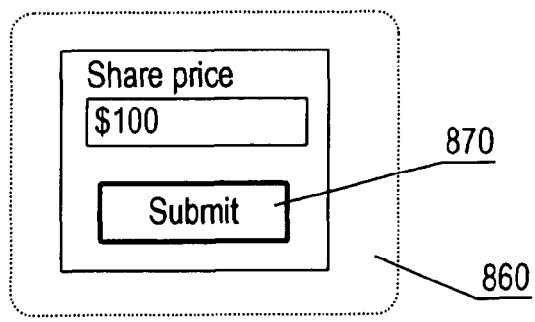

According to FIG. 7, this way, when administrator changes the functionality by exchanging an arc (710) with a new piece (720), system knows when this change was introduced and knows that older objects were created by older version of the functionality and contain different data than the new ones.

Figure 9:
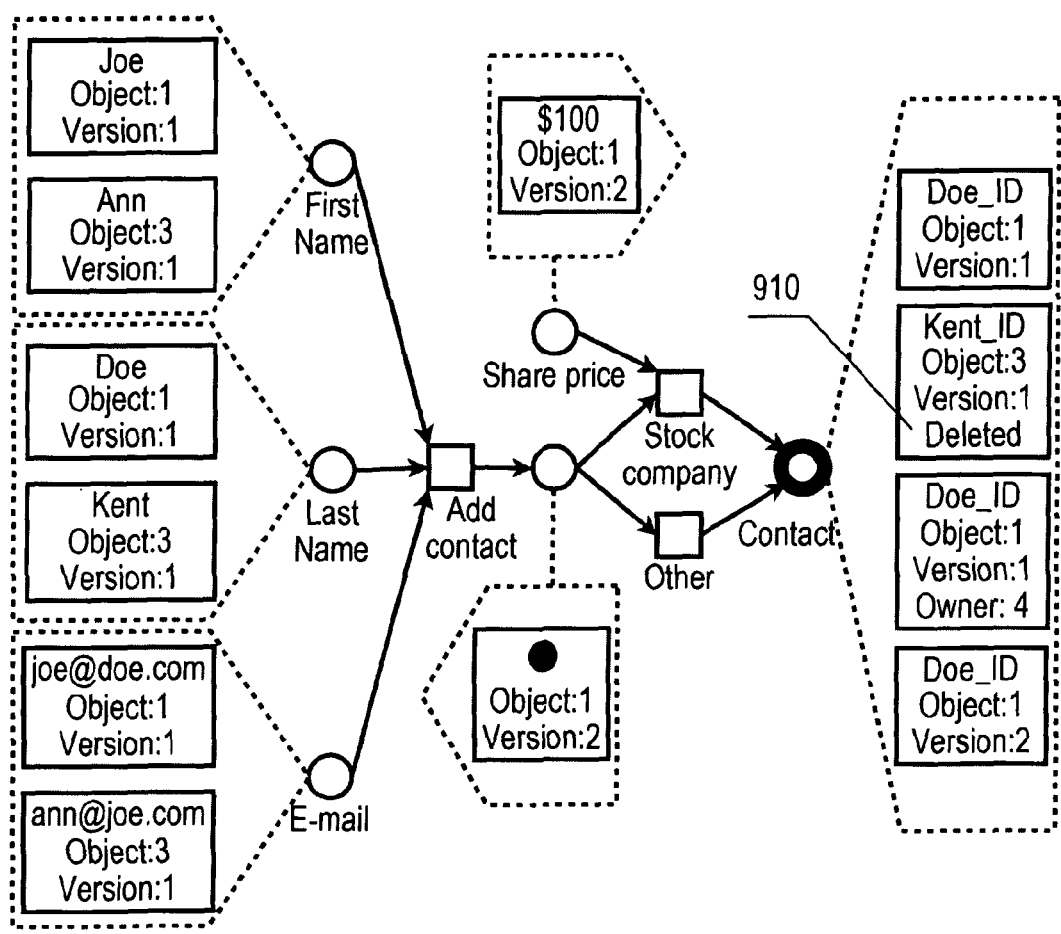
FIG. 9 shows system state after deleting an object with version tracking activated.
Figure 10:
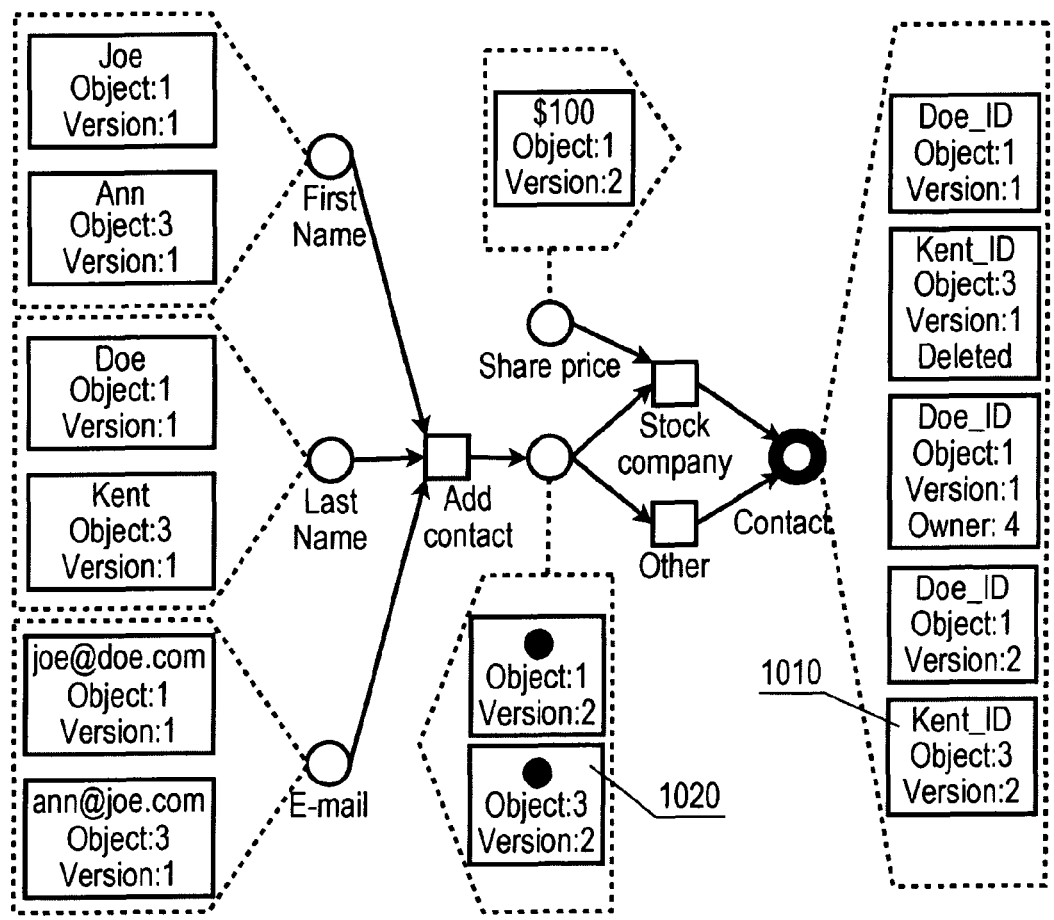
FIG. 10 shows system state after restoring an object with version tracking activated.

We will not draw the "Send mail" functionality (730) in FIG. 8, FIG. 9 and FIG. 10, as it is not relevant in this part of the example.

Since share price information can now be stored, user edits Joe Doe's contact information to enter the share price.

According to FIG. 8, at first a form that looks almost the same as before the change is displayed (810). The only difference is that the button (820) is now labeled "Next" instead of "Submit". Since there is nothing to change here, user clicks that button.

The transition code (which is still empty) is executed and the control token is generated onto the newly added place. That token is needed in this implementation of DCN only to indicate that the control flow has reached this point.

Since version tracking has been activated, old, unchanged tokens gain a version identifier equal to 1 (FIG. 8A) and the new token is tagged as part of object 1, but it's version identifier is equal to 2 (830).

Now, the user is presented with a choice whether the contact is a stock company or not (840), according to the changed layout of the functionality. This choice looks similar to a search result, but is based on information about control flow's advance in the "Add contact" functionality, so only transitions that follow filled places in that functionality can appear in this choice.

User chooses "Stock company" (850) and another form is displayed (860) allowing to enter the share price. After clicking the "Submit" button (870), the share price is stored with version 2 tag (880) and new transition's code is executed. In this example this code is empty.

Since this is a new version of this object, a new identifying token is generated onto the "Contact" place (890) tagged with version 2. This indicates that object 1 has two versions. Note, that data tokens tagged with version 2 do not contain all object 1's data. This is because the unchanged tokens were not copied into new versions of object during editing. Instead, when system needs to access object 1's data in version 2, for each of the object's places it finds data token that is in version 2 or the closest older version if a token in version 2 does not exist. This way storage space needed for data is reduced while all data is stored.

According to FIG. 9, after editing the share price, user decides to delete Ann Kent's contact data. With version tracking activated, the system does not actually delete any data. Since the only way to access an object's data is through its identifying token, it's enough to mark that token as deleted to keep the whole object form user's eyes. In this case, identifying token of object 3 (910) has been marked as deleted.

Since the data is still in the system, all e-mails sent to Ann still have a recipient set, when the user decides to read any of them, but user can't send any new messages to her.

According to FIG. 10, with version tracking activated, user can also restore the deleted objects. When user decides to restore Ann's contact, a new identifying token is created with a new version number (1010). This is done to leave a trace of the fact, that the first version of this contact has been deleted. In this example, the restored contact was created with an old version of the functionality. It is possible to delete such a contact when the functionality has been changed, but as it is restored is has to be completed with the missing information. In this example we assume that user has indicated that Ann is not a stock company contact, so only the control token (1020) has been generated during restore.

Version tracking can be based on timestamps instead of or in parallel with versions and marking the states of tokens. Timestamps give more information and allow having a timeline of the whole system, which enables to see or revert the state of the system to any given moment in the past.

Daily system use shows that the e-mail sending functionality is used a lot more often than adding contact and users reported they need to send e-mails to multiple recipients. To update the system, administrator makes a few changes to the DCN.

Figure 11A:
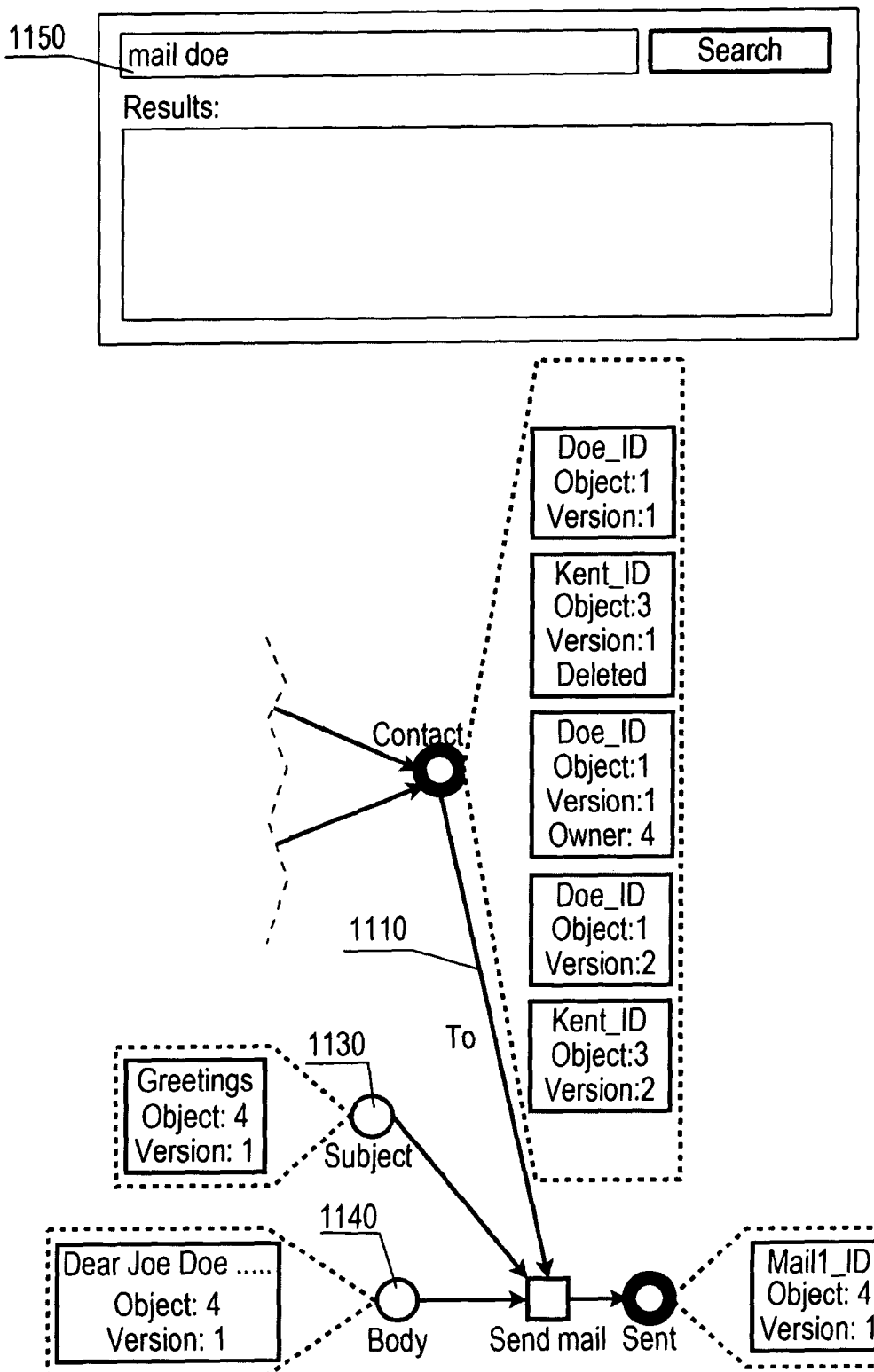
FIGS. 11A-C illustrate using multiple stored objects of the same type in one functionality, running functionality as a subfunctionality of another functionality and how system can learn user's vocabulary from the user's and system's point of view.
Figure 11B:
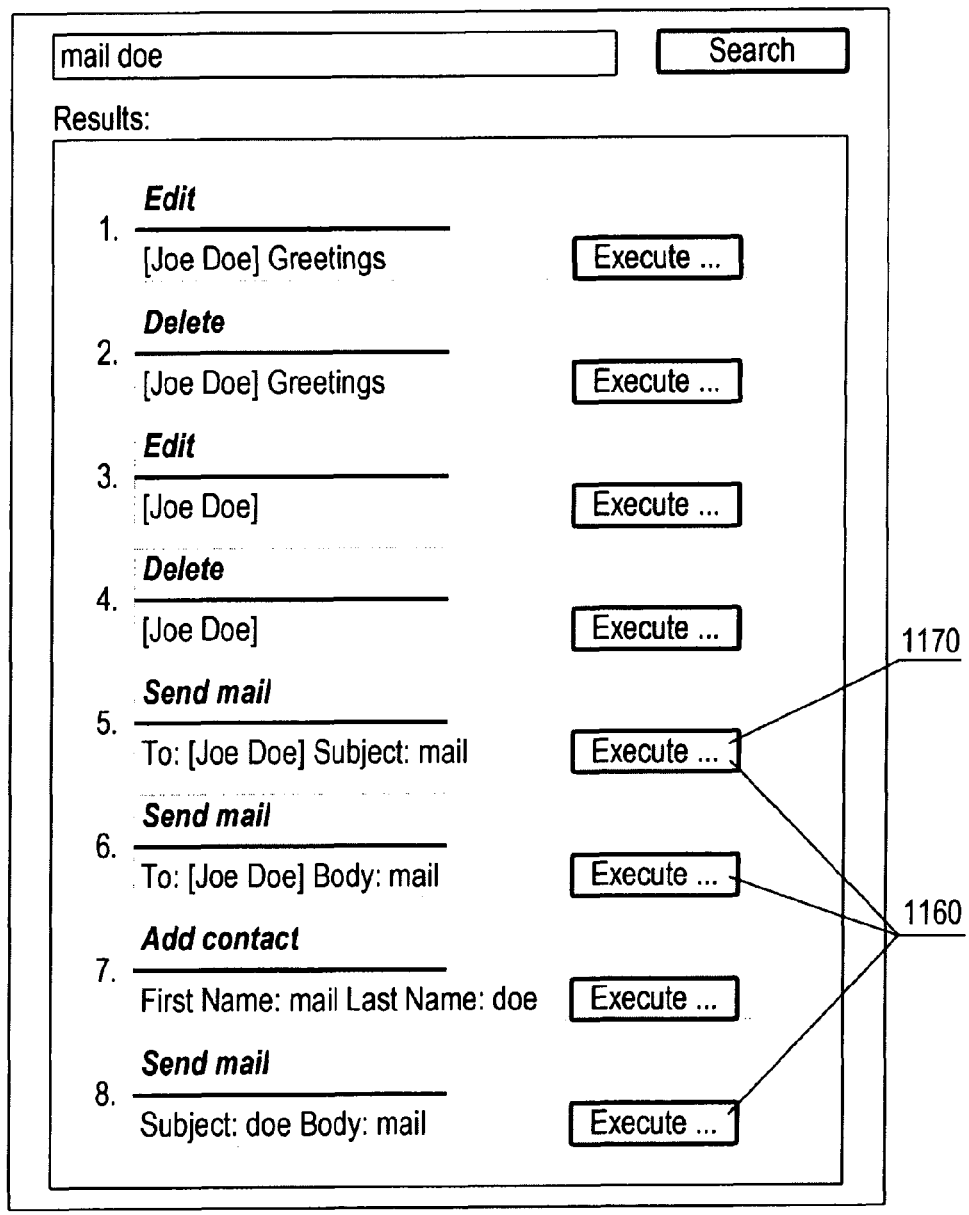
Figure 11C:
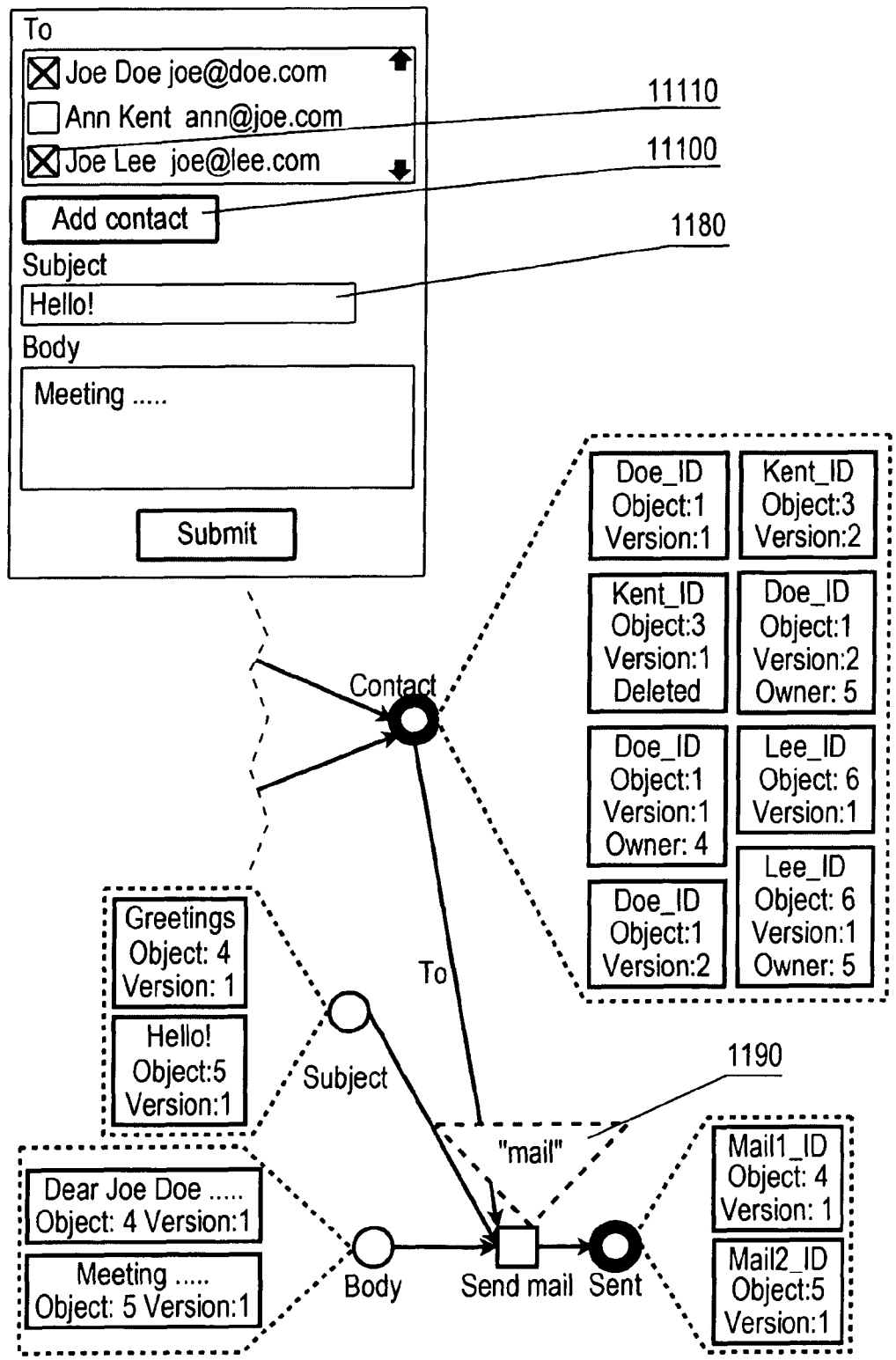

According to FIG. 11, first, administrator enables indicating multiple recipients of emails by changing metadata of the arc connecting "Contact" with "Send" transition (1110). This will cause an UI control that enables multi-selection (1120) to be used in the e-mail composing form.

Then, to make the e-mail functionality easier to find, administrator changes the metadata of its "Subject" (1130) and "Body" (1140) places to include them in the identifying system input process.

After this change user can search for "mail doe" (1150) and the result list (1160) will contain more configurations of the "Send mail" functionality. These configurations appear further in the list, than in previous search result (FIG. 5B), because in this implementation we favor configurations which have less data tokens missing. In previous example the only searchable place of "Send mail" functionality was filled, so found configurations of that functionality had no missing data tokens. Since it now has three searchable places, one of them is empty in every configuration, because user entered only two search tokens in the query.

This drawback will quickly disappear, as the system can learn user's habits of searching and give more accurate results. In this case, after choosing to mail Mr. Doe (1170) user changes the "Subject" field from system suggested text "mail" to "Hello!" (1180). When user finally sends the message, system will notice that the token "mail" was not used as subject, so its suggestion was not what the user had in mind while entering "mail doe" as a search query. The system will then assume that since the "Send mail" functionality was executed in result of that search, the "mail" token meant that user wanted to find that functionality and add this token to the user expressions dictionary of that functionality (1190). Next time user will use this expression in search, the "Send mail" functionality will be listed higher. This way system can learn user's language. Each user can use his own naming of functionalities, but also can influence the way system works for other users.

Before sending the message user clicked the "Add contact" button (11100) to add another recipient who is not in the contact list. The "Add contact" functionality was executed on top of the previously started "Send mail", so as soon as the new contact was created, composing of the message continued. As new contact was created during composing of the e-mail, it was automatically selected as new recipient of the message (11110).

Figure 12:
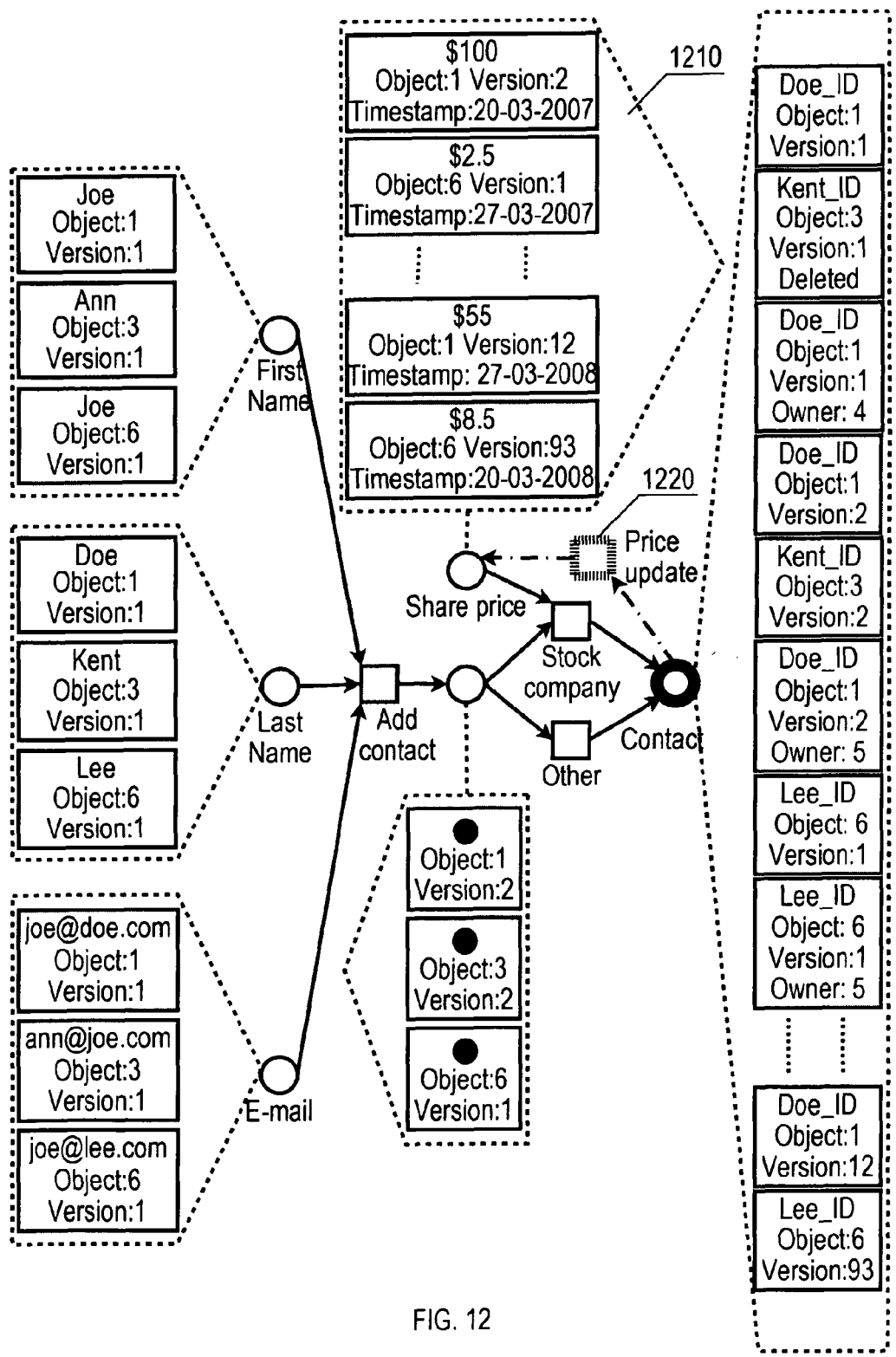
FIG. 12 shows an automatic transition added to a functionality and version history of a single data token.

According to FIG. 12, eventually users started to complain about manually entering their client companies' share price which they need to monitor every day. The administrator added a new functionality that automatically checks the price of each stock company from the contacts on the internet and updates it in the appropriate contact's data every evening (1210) after the stock market is closed. The code of the transition (1220) is responsible for checking and updating the price, while the information about when the system should run the update is set in the transition's metadata.

After a few months, manager wants to see a report which clients hadn't been contacted for more than a month. His policy is to always keep in touch with clients, especially those, whose shares are going up. Knowing that, administrator suggests that thanks to the version tracking feature, the system stores all past share prices, so it is possible to list only those clients, whose shares went up from last month. Manager decides that the report should list clients whose shares went up in last two weeks or they hadn't been contacted for a month. But the time periods should be configurable, because not always only last two weeks are important.

Figure 13:
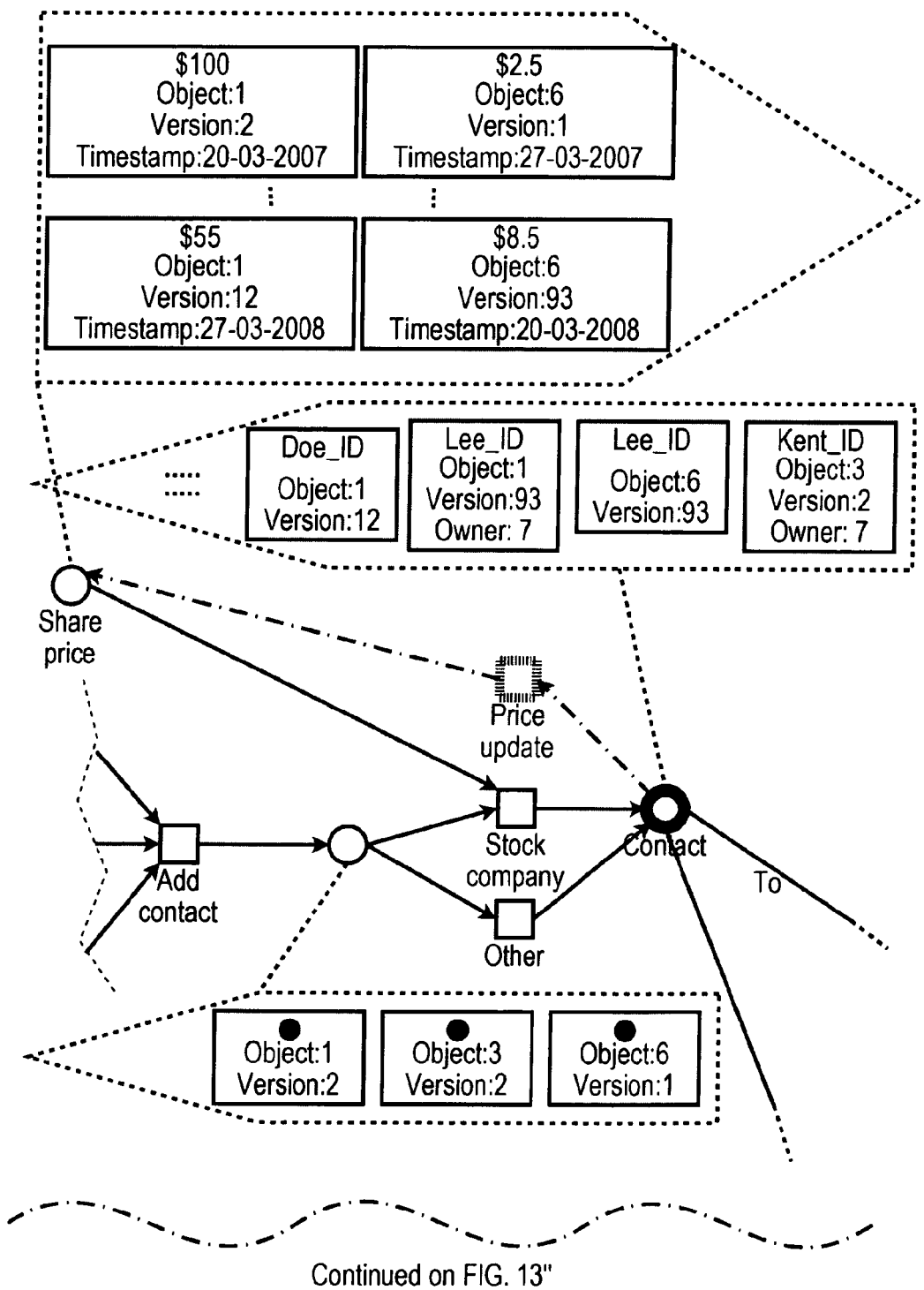
FIG. 13 illustrates data-mining and reporting functionality based on data stored in the system from the user's and system's point of view.

According to FIG. 13, to do that, administrator only needs to add a new functionality, which enables to enter time periods first and then shows the report (1310).

After selecting to create the report, manager needs to enter the period in which to check for the share price to go up in weeks (1320) and the period of mailing inactivity in months (1330). The following transition (1340) searches through clients' historical data and finds the appropriate ones. Then it outputs the data formed in HTML formatted text (1350) and XML data (1360) for a chart drawing control (1370). The manager sees the report as a well formatted document because the administrator used custom controls in the report form. After clicking OK the report is saved for later viewing.

For most of this example, the user interface was automatically generated from the DCN. This is often possible, because the structure of the DCN and metadata stored in it contains enough information to choose the right user interface control for each place and give it appropriate name and label. In the report functionality however, the forms were modified by administrator to show, that DCN also allows creating custom user interfaces.

Figure 14A:
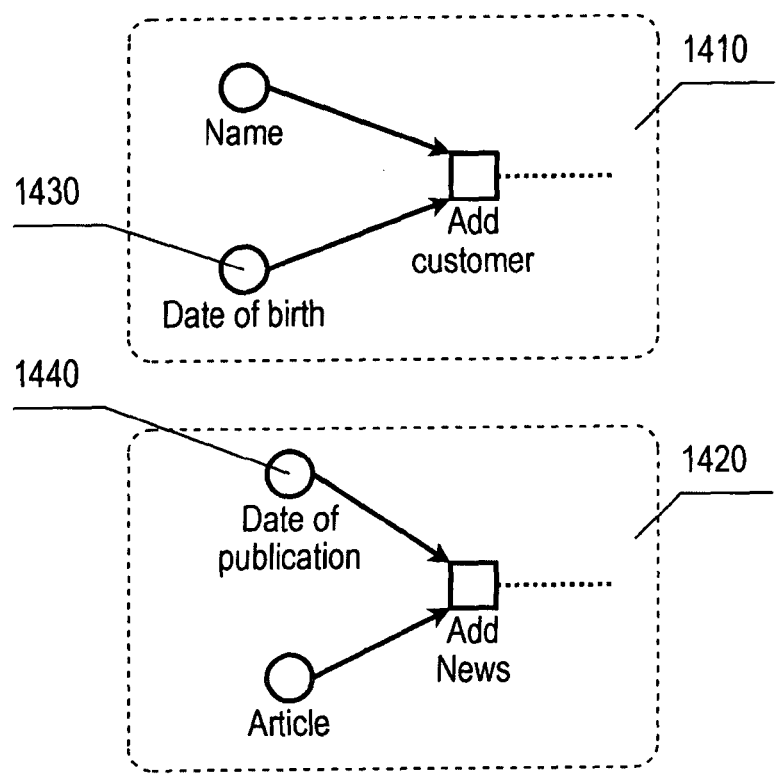
FIGS. 14A-B illustrate merging of places of the same type from different functionalities.
Figure 14B:
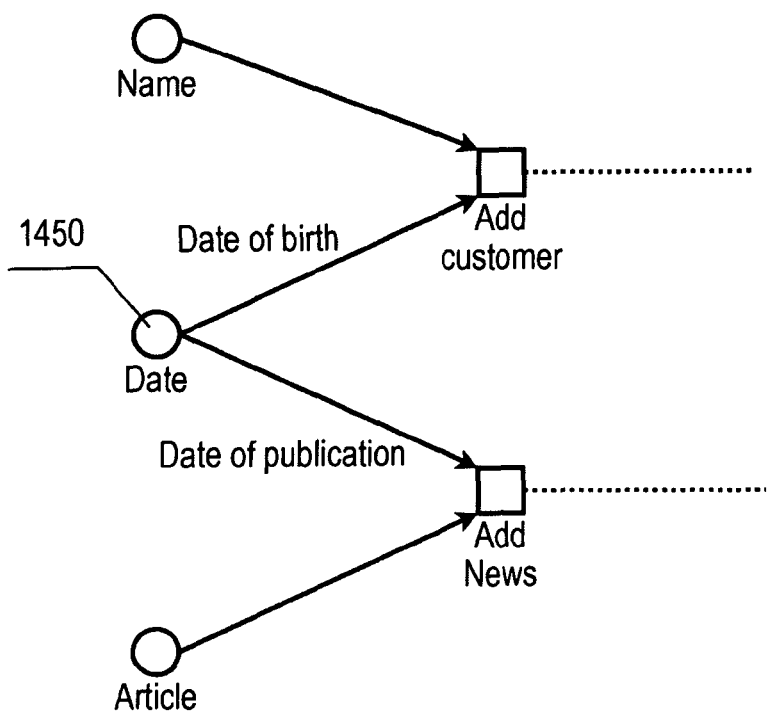

According to FIG. 14, a simple modification of DCN structure can be implemented, which significantly speeds up the functionality search process. The modification is for many functionalities to share common searchable places. For example if a system consists of functionality that stores personal data of customers (1410) and a functionality that stores news articles (1420) both these functionalities can contain places to store a date. In case of personal data it's date of birth (1430) and in case of news article it's date of publication (1440). DCN can merge these places into one (1450), since it's structure is a graph it is only important for the functionalities to have the places connected to them and it is irrelevant whether the places are shared between functionalities or not. As we have shown earlier (650), the name of the place in given functionality can be overridden by naming the arc connecting the place to functionality (l460).

This way, merging the two places will not have any effect on the way the system works to the user, but will significantly simplify the process of identifying system input. During that process, when the system matches a token from user's search query to a searchable place in a DCN, where all possible merges of searchable places have been done, the match automatically affects all possible functionalities. The system doesn't need to match this token any further so the matching becomes very easy and fast.

What is claimed is:

1. A computer implemented method for searching functionalities within a directed control net having a structure comprising nodes connected by directed arcs while each node can be a data container while each directed arc is a functionality that can store functionality code, and can be executed when input nodes contain sufficient data, method comprising:

identifying input node within the directed control net for data token, matching identified input with functionality according to the directed control net structure for generating a group of identified functionalities, transforming data with functionality codes when functionalities are executed according to the structure of directed control net, and creating a new context of the system by storing transformed data token in output nodes according to structure of the directed control net when a directed control net's control flow goes on according to the directed control net structure, wherein when functionality code is executed, data tokens that have been entered into data containers, remain in data containers where they were originally entered, while directed control net's flow goes on according to directed control net structure.

2. Method according to claim 1, wherein properties of the elements of directed control are described by metadata.

3. Method according to claim 1 wherein to identify input a possibility of processing user input is used.

4. Method according to claim 1, wherein to identify input possibility of processing data present within the system and matching to user input are used.

5. Method according to claims 1, wherein it merges selected data containers into one.

6. Method according to claim 1, wherein searching functionality codes is based on user input and properties of a directed control net.

7. Method according to claim 1, wherein it determines distance for deriving a normalized distance within the directed control net.

8. Method according to claim 7, wherein a normalized distance is determined between user input and data.

9. Method according to claim 1, wherein executing another functionality is performed on top of the first one as a subfunctionality.

10. Method according to claims 1, wherein search results are ranked.

11. Method according to claim 1, wherein functionalities are listed along with examples how the user's query matches each functionality.

12. Method according to claim 1, wherein it tracks changes made to the functionalities and remembers all versions of these functionalities as a system version.

13. Method according to claim 12, wherein a system version tracking includes timestamps.

14. Method according to claims 1, wherein keywords and/or expressions dictionaries are attached to functionalities.

15. Method according to claim 1, wherein a directed control net is a timed workflow.

16. Method according to claim 1, characterized in wherein a directed control net is a Petri net.

17. Method according to claim 1, wherein the user interface is automatically generated based on directed control net and/or is a custom user interface.

18. System comprising
one or more storage device that includes directed control net having a structure comprised of
nodes connected by directed arcs while each node can be a data container, while
each directed arc is a functionality that can store functionality code and
can be executed when input nodes contain sufficient data,
a processor that includes
a search module for searching functionalities within directed control net,
which module is identifying input node within directed control net for data token, and matching identified input node with functionality according to the directed control net structure for generating a group of identified functionalities,
a control engine for executing functionalities, which engine is
storing in a storage device a current context of the system when control flow goes on so data tokens that have been entered into data containers remain in data containers where they were originally entered,
transforming data with functionality codes of one or more identified functionalities to obtain transformed data token,
creating a new context of the system by storing transformed data token in output nodes according to structure of the directed control net when a directed control net's control flow goes on according to the directed control net structure.

19. System according to claim 18, wherein properties of the elements of directed control are described by metadata.

20. System according to claim 18 wherein it comprises a search module which uses a possibility of processing user input to identify input.

21. System according to claim 18, wherein it comprises a search module that uses a possibility of processing data present within the system and matching to user input to identify input.

22. System according to claim 18, wherein directed control net merges selected data containers into one.

23. System according to claim 18, wherein it comprises search module for searching functionality codes based on user input and properties of a directed control net.

24. System according to claim 18, wherein it comprises distance determination unit for deriving a normalized distance within the directed control net.

25. System according to claim 18, wherein a normalized distance is determined between user input and data.

26. System according to claim 18, wherein executing another functionality is performed on top of the first one as a subfunctionality.

27. System according to claim 18, wherein search results are ranked.

28. System according to 18, wherein functionalities are listed along with examples how the user's query matches each functionality.

29. System according to claim 18, wherein system comprises a system version unit that tracks changes made to the functionalities and remembers all versions of these functionalities.

30. System according to claim 29, wherein system version tracking includes timestamps.

31. System according to claim 18, wherein keywords and/or expressions dictionaries are attached to functionalities.

32. System according to claim 18, wherein a directed control net is a timed workflow.

33. System according to claim 18, wherein a directed control net is a Petri net.

34. System according to claim 18, wherein the user interface is automatically generated based on directed control net and/or is a custom user interface.

35. Database system with
one or more storage device that includes directed control net having a structure comprising
nodes connected by directed arcs while each node can be a data container, while
each directed arc is a functionality that can store functionality code and
can be executed when input nodes contain sufficient data,
a processor that includes
a search module for searching functionalities within directed control net, which module is identifying input node within directed control net for data token, and matching identified input with functionality according to the directed control net structure for generating a group of identified functionalities,
a control engine used for executing functionalities, which engine is
storing in a storage device a current context of the system when control flow goes on so data tokens that have been entered into data containers remain in data containers where they were originally entered, transforming data with functionality codes of one or more identified functionalities to obtain transformed data token, creating a new context of the system by storing transformed data token it in output nodes according to structure of the directed control net when a directed control net's control flow goes on according to the directed control net structure.

36. Data base system according to claim 35, wherein data stored within directed control net forms objects.

37. Data base system according to claim 35, wherein objects comprise objects and/or data tokens.

38. Data base system according to claim 35, wherein data entered by the user is tagged with newly created context and put into the corresponding places.

39. Data base system according to claim 35, wherein editing of an object is done by going through the functionality editing each data token or in single change without going through the whole functionality.

40. Data base system according to claim 35, wherein data base system comprises all versions of stored objects and/or data tokens.

41. Data base system according to claim 40, wherein system versioning includes using timestamps.

42. Data base system according to claim 41, wherein that all versions stored within the system are accessible to the user and/or to functionalities codes.

43. Data base system according to claim 35, wherein types of data tokens that are stored in containers are determined based on data tokens already stored in those containers and/or the container's metadata.

* * * * *